United States Patent [19]
McConnell et al.

[11] Patent Number: 6,011,373
[45] Date of Patent: Jan. 4, 2000

[54] ROBUST VIBRATION SUPPRESSION METHODS AND SYSTEMS

[75] Inventors: Kenneth G. McConnell, Ames, Iowa; Chad E. Bouton, Dublin, Ohio

[73] Assignee: Iowa State University Research Foundation, Inc., Ames, Iowa

[21] Appl. No.: 09/303,462

[22] Filed: Apr. 30, 1999

Related U.S. Application Data

[63] Continuation of application No. 08/912,283, Aug. 15, 1997.

[51] Int. Cl.$^7$ .................................................. G05B 11/01
[52] U.S. Cl. ......................... 318/560; 318/567; 318/600; 318/569; 360/78.06
[58] Field of Search ................................. 318/560, 561, 318/567, 568.1, 569–574, 600–605, 611, 623, 629; 70/28–39; 360/78.01, 78.04, 78.06, 78.07, 78.09

[56] References Cited

U.S. PATENT DOCUMENTS

| | | |
|---|---|---|
| 4,879,643 | 11/1989 | Chakravarty et al. . |
| 4,897,589 | 1/1990 | Fujiwara et al. . |
| 4,916,635 | 4/1990 | Singer et al. . |
| 5,089,758 | 2/1992 | Sogawa . |
| 5,144,549 | 9/1992 | Youcef-Toumi . |
| 5,164,647 | 11/1992 | Moulds, III . |
| 5,282,130 | 1/1994 | Molnar . |
| 5,321,342 | 6/1994 | Kruse . |
| 5,325,247 | 6/1994 | Ehrlich et al. ...................... 318/611 X |
| 5,329,214 | 7/1994 | Williamson et al. . |
| 5,359,409 | 10/1994 | Wildnauer et al. ...................... 356/334 |
| 5,378,975 | 1/1995 | Schweid et al. . |
| 5,384,506 | 1/1995 | Aoshima . |
| 5,400,256 | 3/1995 | Beale et al. . |
| 5,406,496 | 4/1995 | Quinn . |
| 5,426,545 | 6/1995 | Sidman et al. ...................... 360/78.09 |
| 5,465,035 | 11/1995 | Scaramuzzo, Jr. et al. . |

(List continued on next page.)

OTHER PUBLICATIONS

Alberts et al., "Dynamic Analysis to Evaluate Viscoelastic Passive Damping Augmentation for the Space Shuttle Manipultor System," *Journal of Dynamic Systems, Measurement, and Control* 114:468–475 (1992).

D'Amato et al., "Dynamic Modelling of Mobile Flexible Structures for Improvement of Motion Control," *Proceedings of the 12th International Model Analysis Conference*, Ilikai Hotel, Honolulu, Hawaii, 799–805, Jan. 31–Feb. 3, 1994.

Chen et al., "Adaptive Linerization of Hybrid Step Moters: Stability Analysis," *IEEE Transactions on Automatic Control* 38 (6):874–887 (1993).

Kenjo et al., "Stepping Motors and Their Microprocessor Controls," second edition; Claredon Press; Oxford, England (1994)(Table of Contents Only).

McConnell et al., "Noise and Vibration Control with Robust Vibration Supression," *Sound and Vibration* 24–26 (1997).

Sehitoglu et al., "Design of a Trajectory Controller for Industrial Robots Using Bang–Bang and Cycloidal Motion Profiles," ASME Winter Annual Meeting, Anaheim, CA; *Robotics: Theory and Applications* 3:169–175 (1986).

Singer et al., "Preshaping Command Inputs to Reduce System Vibration," *Journal of Dynamic Systems, Measurement, and Control* 112:76–82 (1990).

Smith, *Feedback Control Systems* (Series in Control System Engineering). McGraw–Hill Book Company, Inc., New York, NY (1958) (Table of Contents Only).

Swigert, "Shaped Torque Techniques," *J. Guidance and Control* 3(5):460–467 (1980).

*Primary Examiner*—Brian Sircus
*Attorney, Agent, or Firm*—Mueting, Raasch & Gebhardt, P.A.

[57] ABSTRACT

Robust Vibration Suppression methods and systems providing improved robustness range and are effective in single or multiple degree of freedom systems are disclosed. Methods disclosed include providing an output response from a physical system by selecting a command input to be applied to a physical system based on robustness and/or noise generation potential as determined by analyzing the frequency spectra of a derivative of the command inputs.

27 Claims, 24 Drawing Sheets

U.S. PATENT DOCUMENTS

| | | | |
|---|---|---|---|
| 5,465,183 | 11/1995 | Hattori | 360/78.09 |
| 5,594,309 | 1/1997 | McConnell et al. . | |
| 5,610,848 | 3/1997 | Fowell | 708/310 |
| 5,638,267 | 6/1997 | Singhose et al. . | |
| 5,659,234 | 8/1997 | Cresens . | |
| 5,659,468 | 8/1997 | Duss | 702/34 X |
| 5,666,297 | 9/1997 | Britt et al. | 706/920 X |
| 5,726,879 | 3/1998 | Sato | 318/561 X |
| 5,729,111 | 3/1998 | Ogura et al. . | |
| 5,736,054 | 4/1998 | Feller et al. . | |
| 5,784,272 | 7/1998 | Schootstra et al. | 327/250 X |
| 5,784,273 | 7/1998 | Madhavan . | |
| 5,790,404 | 8/1998 | Faye et al. . | |
| 5,790,413 | 8/1998 | Bartusiak et al. . | |
| 5,800,331 | 9/1998 | Song . | |
| 5,825,645 | 10/1998 | Konar et al. | 706/16 X |
| 5,850,339 | 12/1998 | Giles . | |
| 5,901,009 | 5/1999 | Sri-Jayantha et al. | 360/78.07 |
| 5,912,821 | 6/1999 | Kobayashi | 701/111 X |
| 5,914,829 | 6/1999 | Kadlec et al. | 360/78.04 |
| 5,929,700 | 7/1999 | Fuller et al. | 327/556 |

— 1% Damping
--- 5% Damping
---- 10% Damping
····· 5% Overshoot

— 1% Damping
-- 5% Damping
— 10% Damping
— 5% Overshoot

ROBUST VIBRATION SUPPRESSION METHODS AND SYSTEMS

This is a continuation of U.S. application Ser. No. 08/912,283, filed Aug. 15, 1997, which is hereby incorporated by reference in its entirety.

BACKGROUND OF THE INVENTION

Reducing unwanted vibrations or oscillations is a major concern for many systems including those as complex as the Remote Manipulator System used on the space shuttle as well as more mundane systems, e.g., the systems used to move the printhead cover in an inkjet printer. Attempts to improve system performance have included providing command inputs designed to reduce residual vibration after moves in the systems. Many command input schemes can, however, suffer from a lack of robustness. As used in connection with the present invention, "robustness" is the ability of the system, in response to the command input, to complete a motion or other output response without excessive residual oscillation/vibration in spite of changes in the system natural frequency.

In any system, it may be desirable to complete a move without residual vibrations when the governing criteria are one or more of (a) robustness, (b) minimum move time, and (c) minimum noise. In some instances, it would be desirable to enhance all of these characteristics, while in others it may be possible to focus on one or two of the characteristics.

Posicast control (O. J. M. Smith 1958) was an early attempt to cancel vibration in flexible systems by breaking the input step into two smaller steps to cancel vibration. This method, however, was not robust with respect to changes in the natural frequency of the system. Shaped torque techniques (Swigert 1980) were developed by using cost functions, but they also lacked robustness properties to system changes. Sehitoglu and Aristizabul (1986) used cycloidal motion profiles, but they had limited success.

More recently, robustness was addressed by a technique as described in U.S. Pat. No. 4,916,635 to Singer et al. Their four-impulse method, however, has a limited robustness range of about −30% to +40% for overshoot levels less than 5%. Furthermore this technique requires an approximate system model that includes every mode to be controlled. In addition, the method requires extra impulses which lengthens the move time.

Most recently, Kenjo and Sugawara (1994) have shown in their book a method called back-phasing which is used in stepper motors to cancel rotor oscillation, but which also lacks robustness. Others have developed feedback control techniques (Chen and Paden 1993) but these methods often require a detailed system model and additional feedback circuitry and hardware.

U.S. Pat. No. 5,594,309 (McConnell et al.) disclose another control method that exhibits increased robustness for systems having a wide spread between the fundamental and second natural frequencies.

In spite of the above attempts at providing robust control methods, a need exists for methods and systems that can supply robust command inputs that can be used to improve system performance in robustness, noise and/or speed as desired by the user.

SUMMARY OF THE INVENTION

Robust Vibration Suppression (RVS) methods and systems according to the present invention provide improved robustness range and are effective in single or multiple degree of freedom systems. RVS methods and systems can reduce vibrations in unknown higher modes of a system without any additional calculations. Only a few parameters need to be adjusted in a system incorporating RVS methods upon initial system setup and a complete system model is not required. The RVS method also works for systems with unknown damping in any or all of its vibration modes.

In one aspect, the present invention provides a method for providing an output response from a physical system by selecting a command input to be applied to a physical system having a fundamental natural frequency ($f_n$); obtaining a frequency spectra; determining whether the robustness of the command input meets or exceeds a desired level of robustness based on the width of a frequency notch in the frequency spectra; and applying the command input to the physical system to obtain an output response if the robustness of the command input meets or exceeds the desired level of robustness.

In another aspect, the present invention provides a method for providing an output response from a physical system by selecting a command input to be applied to a physical system having a fundamental natural frequency ($f_n$); obtaining a frequency spectra; determining whether the potential of the command input to generate noise from the physical system meets or exceeds a desired level of potential noise generation based on the peak magnitudes of the frequency spectra; and applying the command input to the physical system to obtain an output response if the potential of the command input to generate noise meets or exceeds the desired level of potential noise generation.

In another aspect, the present invention provides a method for providing an output response from a physical system by selecting two or more command inputs to be applied to a physical system having a fundamental natural frequency ($f_n$); obtaining a frequency spectra for each of the command inputs; determining the relative robustness of the command inputs based on the width of a frequency notch in each of the frequency spectra, wherein the more robust command input has a wider frequency notch; selecting the more robust command input as the final command input; and applying the final command input to the physical system to obtain an output response.

In another aspect, the present invention provides a method for providing an output response from a physical system by selecting two or more command inputs to be applied to a physical system having a fundamental natural frequency ($f_n$); obtaining a frequency spectra for each of the command inputs; determining the relative potential of each of the command inputs to generate noise from the physical system based on the relative peak magnitudes of each of the frequency spectra over a range of frequency ratios, wherein the peak magnitudes of the frequency spectra for the command input with the smaller potential to generate noise are lower than the peak magnitudes of the frequency spectra of the other command inputs over the range of frequency ratios; selecting the command input with the smaller potential to generate noise as the final command input; and applying the final command input to the physical system to obtain an output response.

In another aspect, the present invention provides a method for providing an output response from a physical system by selecting two or more command inputs to be applied to a physical system having a fundamental natural frequency ($f_n$); obtaining a frequency spectra for each of the command inputs; ranking the command inputs for robustness based on the width of a frequency notch in each of the frequency spectra; ranking the command inputs for noise generation potential based on the relative peak magnitudes of each of the frequency spectra over a range of frequency ratios; selecting one of the command inputs based on the rankings for robustness and noise generation; and applying the selected command input to the physical system to obtain an output response.

These and other features and advantages of the present invention are described more completely below.

DETAILED DESCRIPTION OF THE PREFERRED EMBODIMENTS

Figure 1:
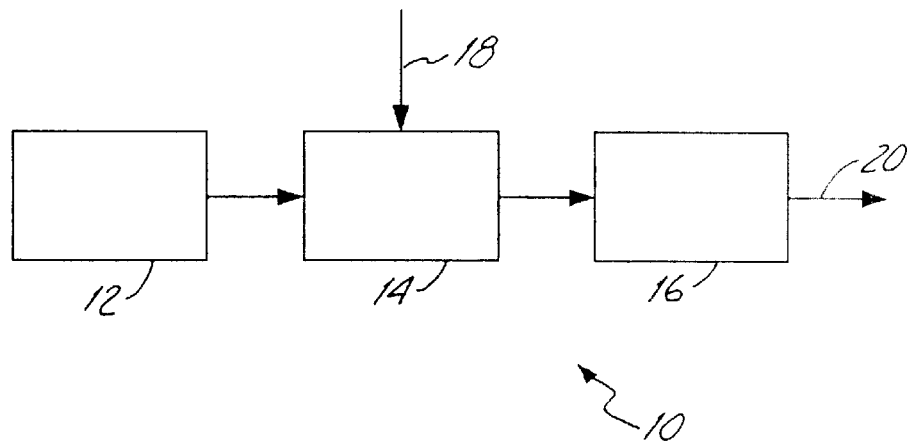
FIG. 1 is a schematic diagram of a physical system in which command inputs determined by the methods and/or control systems according to the present invention can be applied.

The RVS methods and systems according to the present invention reduce unwanted vibrations for a wide variety of systems with robustness to changing system parameters. RVS methods and systems are open-loop techniques that do not require feedback, but they can be used in open or closed-loop systems. RVS methods and systems can be effective in a wide variety of open or closed-loop electrical, mechanical, electromechanical, and other oscillatory systems.

As discussed above, "robustness" is the ability of the system to complete a motion or other output response without excessive residual vibration in spite of changes in the natural frequency of the system. Robustness can also be expressed in terms of a "robustness function" which is a plot of the maximum residual vibration response that occurs at the end of a preshape command, i.e., after preshape move time ($T_p$) as a function of $T_n$ or normalized form of $T_p/T_n$ where $T_n$ is the period of the fundamental natural frequency of the system. As a result, it can be seen that the fundamental natural frequency of a system (and its natural period $T_n$) often controls the robustness function because the largest overshoots are often dominated by this frequency term.

In any control system, three characteristics must be balanced. One characteristic is robustness, i.e., the ability of the system to complete a motion or other output response without significantly increasing residual vibration in spite of changes in fundamental natural frequency of the system.

Another characteristic is the response time, i.e., the time required to complete a move which is either the command input period or a function of the command input period. Response time is important in many applications and is typically easier to minimize in systems that show little change in natural frequency during system operation or aging.

Noise is another characteristic that can be significantly affected by the command input used to control moves in a system. Noise can be generated by the supporting structure as well as the structure being moved and is typically directly associated with the torque or force applied to the structural system. As discussed below, it is possible to predict the effect of a given command input on noise generation.

Balancing robustness, response time and noise requires design trade-offs. For example, improving robustness typically requires a sacrifice in response time. Likewise, minimizing noise generation may also require a sacrifice in response time. The present invention provides methods of selecting command inputs that offer improved robustness in system response, as well as methods of selecting preshapes that can reduce noise generated by the system.

The methods and systems according to the present invention can be used in many different physical systems, including mechanical (e.g., cam or mechanism generated motion), electrical (e.g., voltage input to an oscillatory circuit), electromechanical (e.g., a robotic manipulator), hydraulic or fluid based systems, etc., in which a command input is used to obtain a desired system output response. All of the physical systems are oscillatory, i.e., the output response can result in residual vibration or oscillation at the end of the command input period. The oscillatory nature of the physical systems can, however, be controlled through the application of robust command inputs that reduce unwanted residual motion at the end of the command input period. Furthermore, the methods and systems of the present invention can be implemented in any suitable form including hardware, software, and combinations of hardware and software, as well as in physical forms such as cam mechanisms, etc.

FIG. 1 is a schematic representation of a physical system 10 in which command inputs from the methods and systems according to the present invention may find application. The physical system 10 includes an actuator 14 acting on an oscillatory structure or circuit 16. The physical system 10 may include an actuator base or support 12 that may itself be oscillatory in nature. The actuator 14 acts on the oscillatory structure or circuit 16 in response to a command input 18. The result of the actuator 14 acting on oscillatory structure or circuit 16 in response to command input 18 results in output response 20 from the oscillatory structure or circuit 16. The physical system 10 may, optionally, include a feedback loop for closed-loop systems, but, as discussed above, the present invention is applicable to both open- and closed-loop systems.

Beginning with an oscillatory system possessing a natural period ($T_n$), various basic command inputs can be processed by the method described herein to synthesize new command inputs with improved robustness. In one embodiment, the methods and systems according to the present invention involve selecting a given initial command input, manipulating the initial command input to obtain an intermediate command input or waveform, integrating the intermediate result to obtain a command input, and applying the command input to a physical system.

Figure 2:
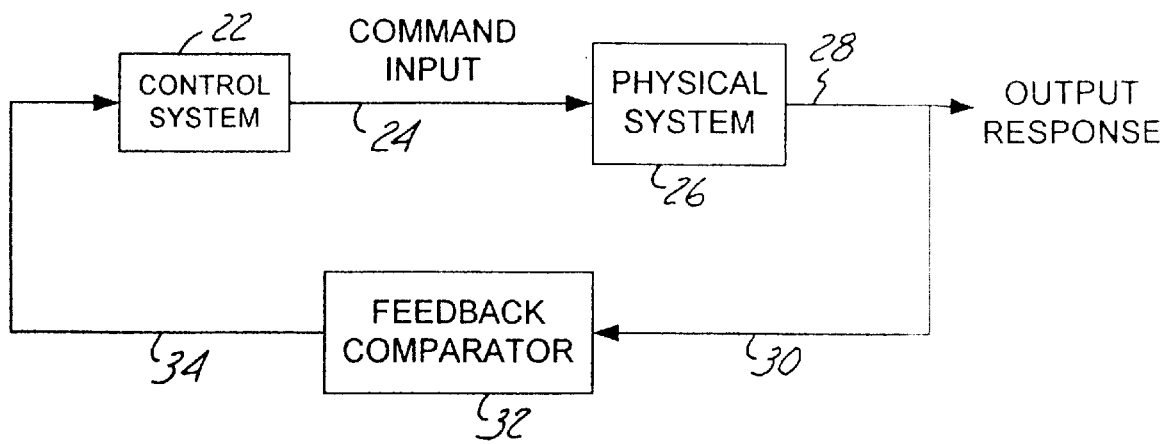
FIG. 2 is a schematic diagram of one system for selecting a command input according to the methods of the present invention.

In some systems and methods according to the present invention, the system output response to the command input can be analyzed and the method adapted to change the system output response. One example of such a system is depicted in FIG. 2 and includes a control system 22 generating command inputs 24 that are input into a physical system 26. An output response 28 is generated by the physical system 26 in response to the command input 24.

The system depicted in FIG. 2 includes an optional feedback loop which monitors the output response 28 and provides a feedback signal 30 to a feedback comparator 32. The feedback comparator 32 compares the output response 28 to established criteria to determine whether an adjustment signal 34 is required to adjust the control system 22 such that command input 24 is adjusted to obtain a different output response 28 from the physical system 26 in response to the command input 24.

The feedback comparator 32 and the rest of the feedback loop can take many different forms. In more automated systems, the feedback loop may automatically monitor output response 28 for a variety of factors such as response time, noise generation, and/or residual motion/vibration. If the output response 28 falls outside of a desired range for one or more of those characteristics as determined by the feedback comparator 32, an adjustment signal 34 can be directed into the control system 22 to cause the command input 24 to change and, ideally, cause the output response 28 from the physical system 26 to fall within the desired ranges for those factors. The feedback comparator 32 may take the form a computational device such as a computer or microprocessor and the comparing of actual to desired output responses may be implemented in hardware, software or a combination thereof.

For example, if the system output response 28 to a first command input 24 results in excessive noise, the feedback comparator 32 can be used to monitor that output response 28 by signal 30, determine that noise caused by first command input 24 acting on the physical system 26 exceeds desirable levels and the methods as described below can then be implemented within the control system 22 to reduce noise.

The present invention provides methods and control systems that capitalize on the information provided by the acceleration frequency spectra for a given command input, typically obtained from a Fourier Transform of the second derivative of the equation representing a given command input. In many systems, the second derivative curve is indicative of acceleration as will be understood by those skilled in the art, and as a result, the frequency spectra curve provided by the Fourier Transform will generally be referred to below as the acceleration frequency spectra curve. There are also two additional ways to determine the acceleration frequency spectra. For example, the Fourier Transform of the position command function can be multiplied by $(j\omega)^2$ to obtain the acceleration frequency spectra of the command input. Alternatively, the Fourier Transform of the velocity signal corresponding to the command input can be multiplied by $(j\omega)$ to obtain the acceleration frequency spectra of the command input. As a result, the methods according to the present invention typically involve performing a Fourier Transform to obtain the acceleration frequency spectra of a given command input, although any other method of obtaining the acceleration frequency spectra of a given command input should be considered as within the scope of the present invention, including the use of look-up tables, etc.

Figure 3:
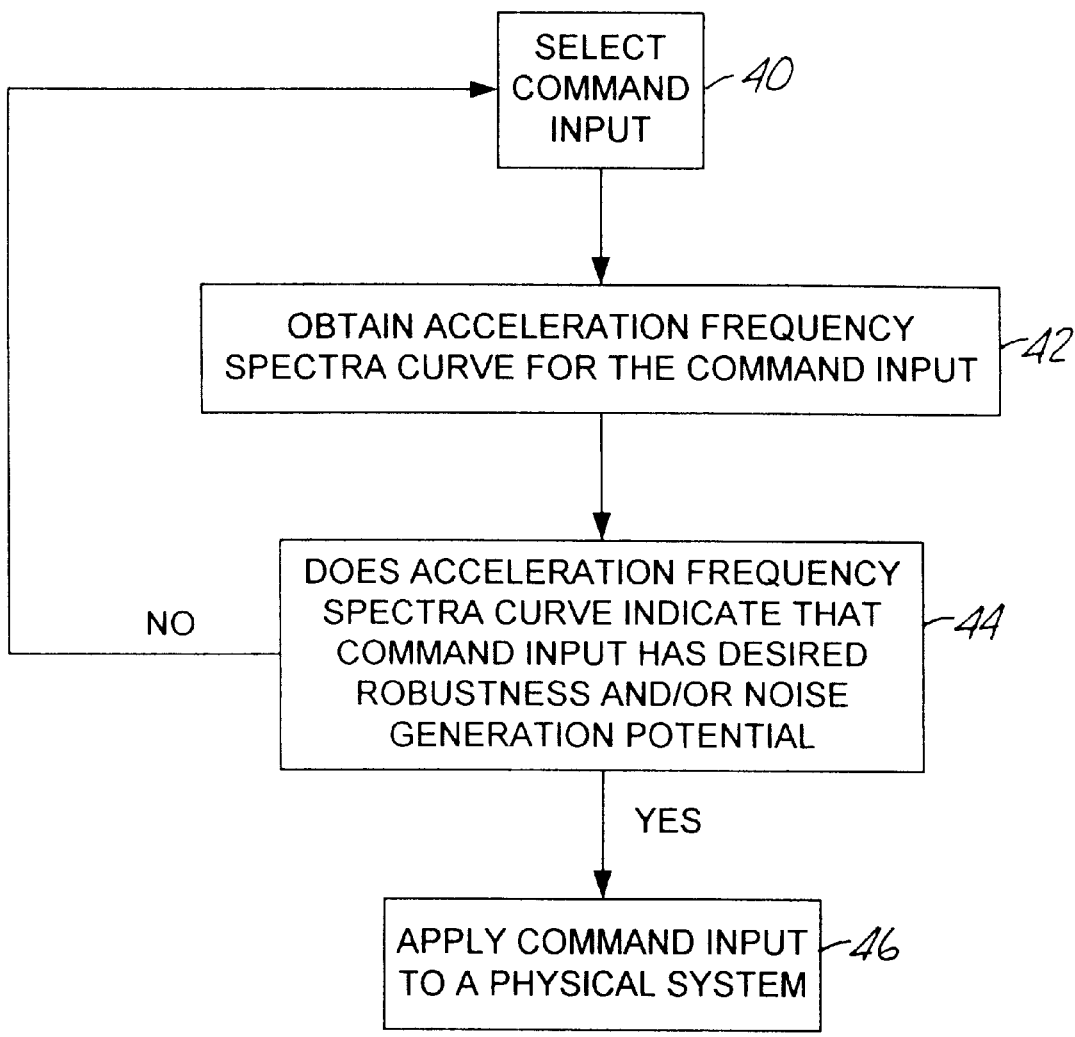
FIG. 3 is a flow diagram of one method of selecting a command input according to the present invention.

In one method according to the present invention that is depicted in FIG. 3, the acceleration frequency spectra curve can be used to determine the robustness and potential for noise generation of any given command input. If those characteristics are acceptable, the command input can be applied to a physical system. If they are not acceptable (based on an analysis of the acceleration frequency spectra for the command input), then another command input can be selected and evaluated.

The method depicted in FIG. 3 involves the steps of selecting a command input 40, obtaining the acceleration frequency spectra curve for the command input 42, determining whether the acceleration frequency spectra curve indicates that the command input has the desired robustness and/or noise generation potential 44. If the command input does appear to have the desired robustness and/or noise generation potential based on analyses of the acceleration frequency spectra curve, then the command input is applied to a physical system to obtain a desired output response 46. If the analyses of the acceleration frequency spectra curve indicate that the command input does not have the desired robustness and/or noise generation potential, then a new command input is selected as indicated in step 40.

In some instances, robustness can be expressed in terms of notch width of the acceleration frequency spectra curve where notch width is expressed in terms of the frequency ratio $f/f_n$ and the magnitude of the largest local peak in the acceleration frequency spectra curve. By largest local peak, we refer to the magnitude of the largest peak on either side of the notch in question. As one example, a desired level of robustness may be indicated by a command input that has an acceleration frequency spectra curve with at least one notch width of about 0.95 $(f/f_n)$ or less to about 1.05 $(f/f_n)$ or more at a magnitude of about 1% or less of the magnitude of the largest local peak. More preferably, the notch width is about 0.9 $(f/f_n)$ or less to about 1.1 $(f/f_n)$ or more at a magnitude of about 5% or less of the magnitude of the largest local peak. Although these numbers are specific, it will be understood that the robustness determination may vary between systems. A more general way of expressing these criteria can be recited as an acceleration frequency spectra curve having a notch width within desired limits at a magnitude equal to a desired percentage of the magnitude of the largest local peak in the acceleration frequency spectra. These concepts will be illustrated below with reference to FIGS. 5–9.

The desired notch width preferably occurs in at least one of the first five notches in the acceleration frequency spectra curve, more preferably within the first two notches, and even more preferably at the first notch. Again, these concepts will be illustrated below with reference to FIGS. 5–9.

In a similar manner, the potential of a command input to generate noise may be judged numerically as well based on the acceleration frequency spectra curve associated with the command input. It may be preferred that the peak magnitudes of the acceleration frequency spectra at frequency ratios of about 5 $(f/f_n)$ or more be about 5% or less of the magnitude of the largest peak in the acceleration frequency spectra; more preferably the peak magnitudes at frequency ratios of about 5 $(f/f_n)$ or more are about 0.5% or less of the magnitude of the largest peak. Alternatively, it may be preferred that the peak magnitudes of the acceleration frequency spectra at frequency ratios of about 10 $(f/f_n)$ or more be about 5% or less of the magnitude of the largest peak in the acceleration frequency spectra; more preferably the peak magnitudes at frequency ratios of about 10 $(f/f_n)$ or more are about 0.5% or less of the magnitude of the largest peak. On a more general level, this concept can be expressed as the command input has the desired level of potential noise generation when the acceleration frequency spectra of the command input has peak magnitudes below a desired level over a range of frequency ratios. As above, these concepts will be illustrated below with reference to FIGS. 5–9.

Figure 4:
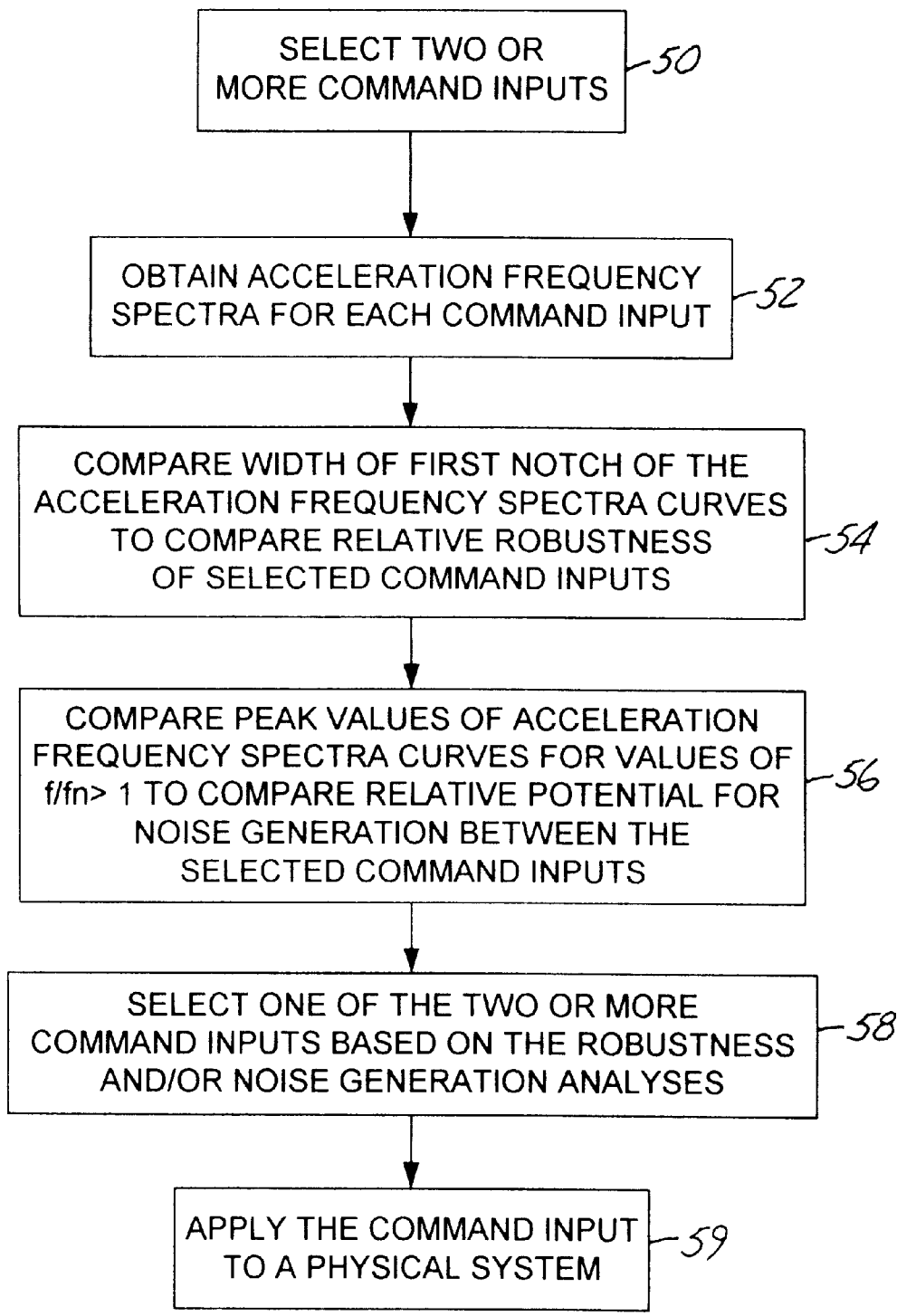
FIG. 4 is a flow diagram of another method of selecting a command input according to the present invention.

In another method according to the present invention, depicted in FIG. 4, the acceleration frequency spectra can be used to determine the relative robustness and potential for noise generation between two or more command inputs for the same physical system. This second method is the more typical scenario, i.e., where the choice between two or more different command inputs leads to a desire to compare the command inputs.

The method depicted in FIG. 4 involves the steps of selecting two or more command inputs 50; obtaining an acceleration frequency spectra curve for each command input 52; comparing the width of the first notch of the acceleration frequency spectra curves to determine the relative robustness of the command inputs 54; comparing the peak values of the acceleration frequency spectra curves for values of $f/f_n$ greater than one to determine the relative potential for noise generation between the command inputs 56; selecting one of the command inputs based on the robustness and/or noise generation analyses 58; and applying the selected command input to a physical system to obtain a desired output response 59.

It will be understood that in the method depicted in FIG. 4, the steps of comparing the acceleration frequency spectra curves for robustness and noise generation potential (steps 54 and 56) are both optional, i.e., the method could include only one of the steps or both as desired in a particular instance. For example, it may be desired to compare different command inputs for only robustness or noise generation potential rather than both characteristics.

Figure 5:
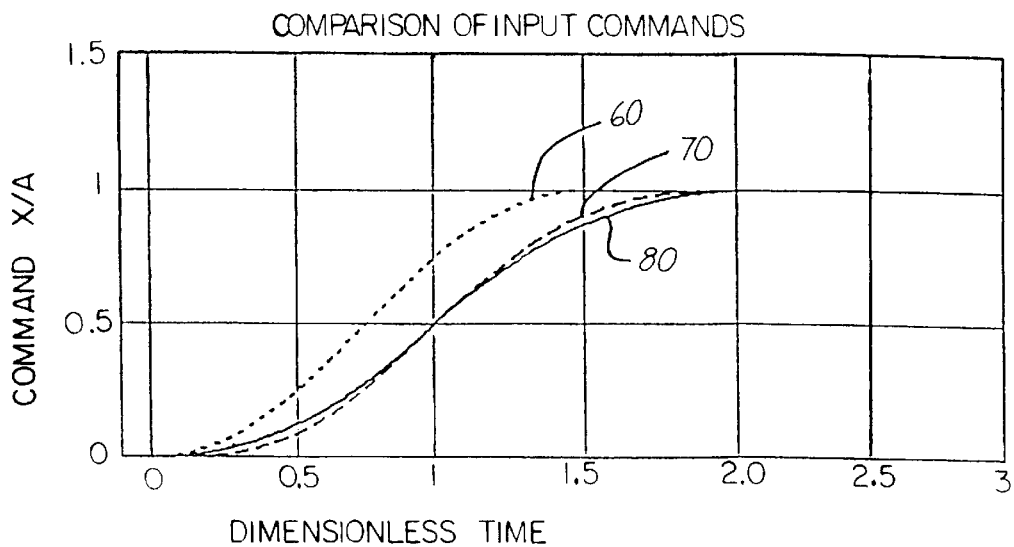
FIG. 5 is a composite plot of the final command inputs depicted and described below in FIGS. 16, 18, and 22.

FIG. 5 illustrates three different dimensionless command inputs (x/A) plotted as a function of dimensionless time (t/$T_n$). A comparison of these command inputs based on the principles discussed above will now be described to illustrate methods according to the present invention. For simplicity, the three command inputs will be referred to here by acronyms, i.e., OMC command input 60, RMS command input 70, and ATS command input 80, although it should be noted that each of the command inputs are described in detail below. The command inputs have different command input periods which are represented as a function of the natural period, $T_n$, of the physical system to which the command inputs are applied. The shortest command input period of the three command inputs depicted in FIG. 5 is 1.5 $T_n$ and is associated with the OMC command input 60, while both the RMS command input 70 and the ATS command input 80 have command input periods of 2 $T_n$.

Figure 6:
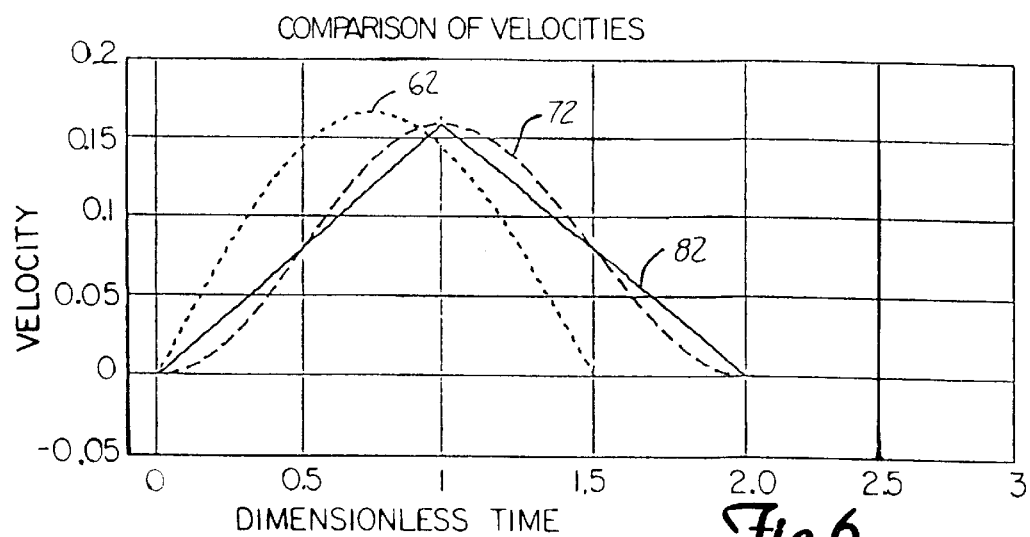
FIG. 6 is a composite plot of the velocity profiles for the command inputs depicted in FIG. 5.
Figure 7:
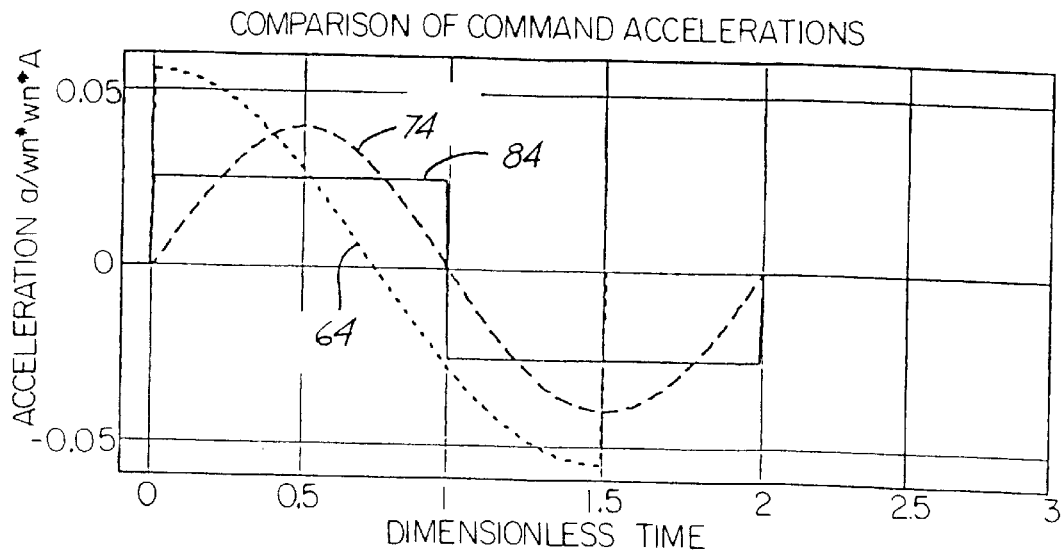
FIG. 7 is a composite plot of the acceleration profiles for the command inputs depicted in FIG. 5.
Figure 8:
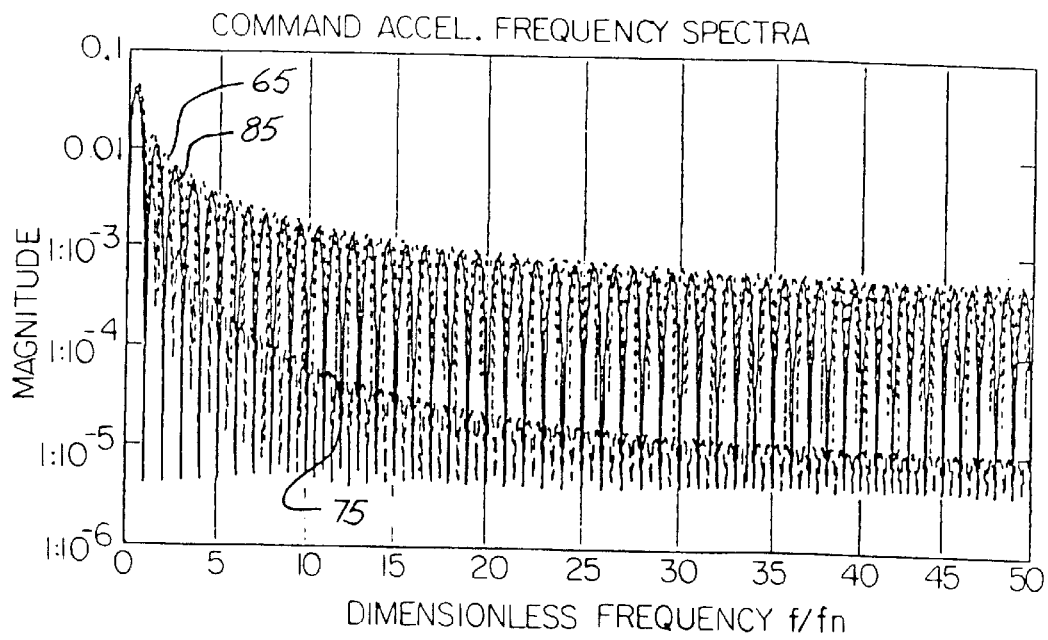
FIG. 8 is a composite plot of the frequency spectra of the acceleration profiles depicted in FIG. 7.

The corresponding dimensionless velocity (v/$\omega_n$A) profiles generated as a result of the command inputs, i.e., OMC velocity profile 62, RMS velocity profile 72 and ATS velocity profile 82, are all plotted in FIG. 6 as a function of dimensionless time. FIG. 7 contains plots of the corresponding dimensionless acceleration (a/$\omega_n^2$A) profiles, i.e., OMC acceleration profile 64, RMS acceleration profile 74 and ATS acceleration profile 84. FIG. 8 is a plot of the frequency spectra of the Fourier Transforms of the command input acceleration profiles of FIG. 7. As shown, the RMS frequency spectra curve 75 of the RMS acceleration profile 74 is magnitudes lower than the OMC frequency spectra curve 65 of the OMC acceleration profile 64 and the ATS frequency spectra curve 85 of the ATS acceleration profile 84 for frequency ratios greater than 5 f/$f_n$.

Figure 9:
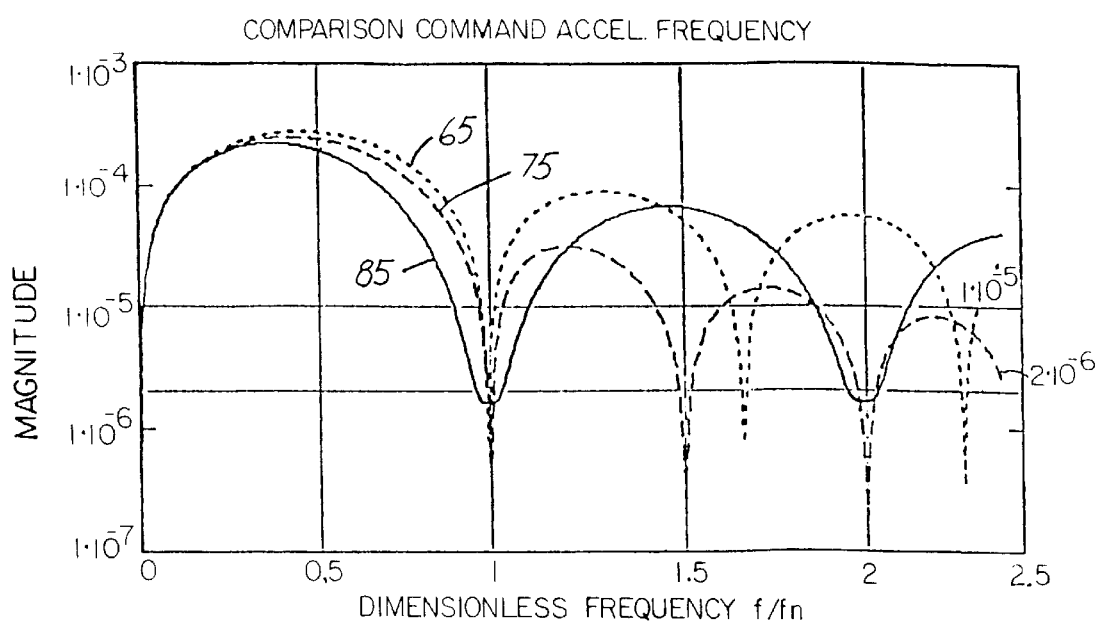
FIG. 9 is an expanded view of the first and second lower frequency notches from FIG. 8.

FIG. 9 is an enlarged view of the first two frequency notches from FIG. 8 and illustrates some of the basic concepts behind the present invention. First, the ATS frequency spectra curve 85 shows the broadest notch at a frequency ratio of one which is indicative of the relative ability of the ATS command input to accommodate small changes in the fundamental natural frequency of the system to which the command input is applied as compared to the RMS and OMC command inputs. If the selection criteria relating to notch width as a function of frequency ratio is applied, the magnitude of the acceleration frequency spectra for the first notch of the ATS curve 85 at +10% of f/$f_n$ is about 4% of the magnitude of the largest local peak ($10^{-5}$), while the magnitude of the acceleration frequency spectra for the first notch of the ATS curve 85 at ±5% off/$f_n$ is about 1% of the magnitude of the largest local peak (2×$10^{-6}$). As can be seen from FIG. 9, the corresponding magnitudes for either the OMC and RMS curves 65 and 75 would be orders of magnitude higher than for the ATS curve 85 at the same notch widths, i.e., ±10% or +5% of f/$f_n$.

As discussed above, this is indicative of a robust command input, i.e., a command input that is capable of handling changes without resulting in an output response accompanied by large increases in residual vibration when there are small changes in $f_n$. Such changes could be caused by, e.g., wear do to use or other causes, manufacturing tolerances, changes in system damping or stiffness, etc.

Also depicted in FIG. 9 is the relatively steep reduction in the peak magnitudes of the RMS acceleration frequency spectra curve 75 for higher frequencies. The magnitude of the acceleration frequency spectra curves for frequencies over one is an indicator of the relative ability of each of the command inputs to excite the higher frequency components in a given physical system. This aspect of the acceleration frequency spectra curves can be correlated to the relative potential of each system to generate noise as a result of application of the corresponding command input.

As a general rule in the methods according to the present invention, the command input chosen should be applied for a command input period that is related to the natural frequency, $f_n$, of the physical system to which the command input will be applied. By so doing, the output response of the physical system will exhibit reduced residual vibrations at the end of the command input period as demonstrated by the acceleration frequency spectra curve. In other words, applying a command input with a command input period that is properly matched with the natural frequency of the physical system will result in placement of the combination of the physical system and command input within one of the notches in the acceleration frequency spectra curve, preferably one of the first five notches, more preferably within the first two notches, and even more preferably within the first notch.

Matching of the command input period to the natural frequency of the physical system is accomplished by applying the command input over its complete command input period, where the command input period has the proper relationship to the natural frequency of the physical system. The relationship between the command input periods and the natural frequency of the physical system is illustrated in FIG. 5 as a function of the natural period, $T_n$, of the physical system (where $T_n$=1/$f_n$). The OMC command input period is 1.5 $T_n$ and the RMS and ATS command input periods are both 2 $T_n$.

The matching between the command input period can take a variety of forms such as selection of the command input with the proper command input period for a physical system in which the fundamental natural frequency is known. It may not, however, be possible to have enough knowledge of all the variables in the physical system to know the natural frequency of the system. As a result, the command input period could be adjusted such that it has the proper relationship to the expected or typical natural period, $T_n$, of the physical system. This method is depicted in the flow diagram of FIG. 10. Evidence of the proper relationship between the command input period and the natural period of the physical system will be seen in reductions in noise and/or residual vibration at the end of the command input period.

Figure 10:
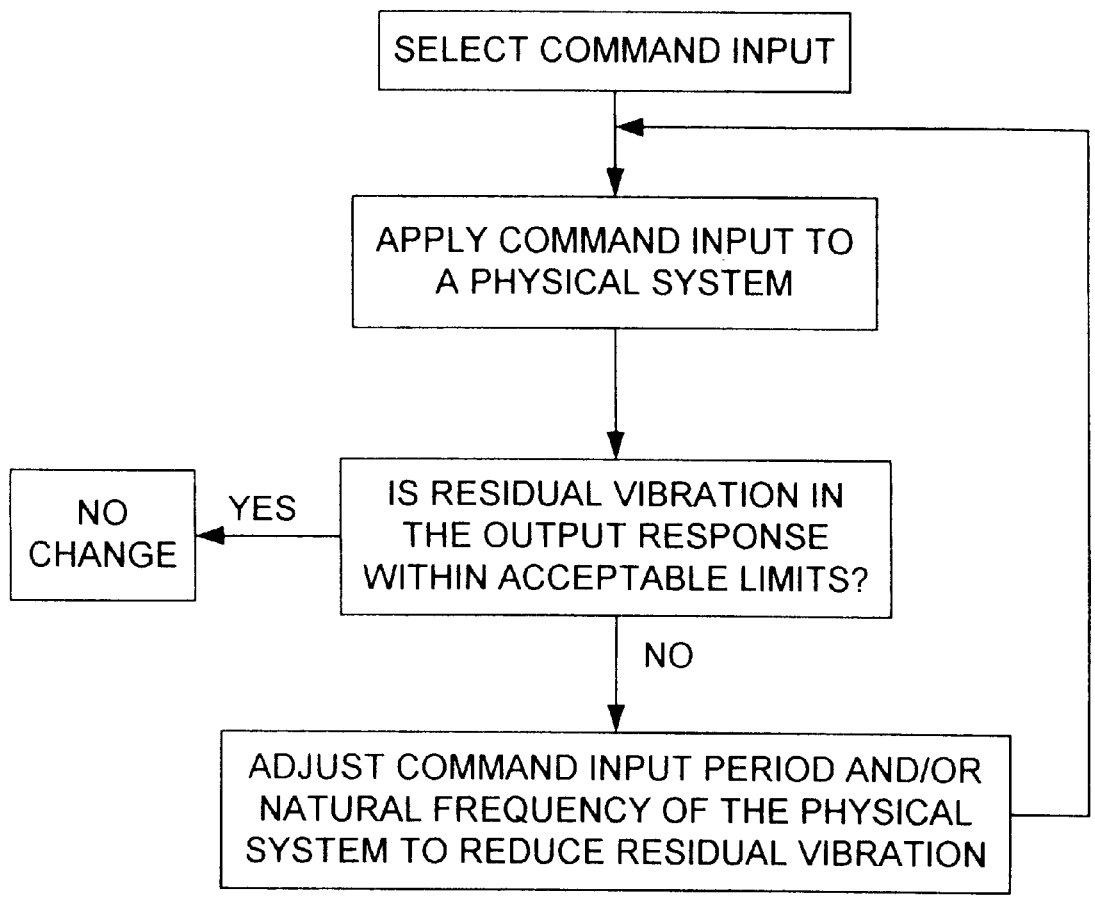
FIG. 10 is a flow diagram of one method of tuning a command input and physical system to reduce residual vibration in the output response.

As illustrated in FIG. 10, one alternative to adjusting the command input period to match the natural frequency of the physical system could include adjusting the natural frequency of the physical system such that the command input period has the proper relationship to the natural period of the physical system. When applying the methods of the present invention to the selection of a command input and command input period, however, the user can select more robust command inputs if the variations in the physical system are expected to be significant enough to cause residual movement outside of desired limits.

As discussed above, the present invention provides the ability to determine the relative potential of any two or more command inputs applied to a physical system for their respective command input periods to result in residual vibration and noise, as well as determine the relative robustness of the two command inputs. All of these characteristics can be compared between two or more command inputs by analysis of the acceleration frequency spectra of the command inputs as discussed above.

For example, if speed (i.e., quickest response time) was the only criteria, then the OMC command input 60 in FIG. 5 would be chosen among the group of command inputs illustrated there because its command input period is the shortest (1.5 $T_n$) as compared to the other two command inputs. Likewise, if robustness is required, it is likely that the ATS command input (see FIG. 5) would be selected based on the width of the acceleration frequency spectra curve at the first notch (f/$f_n$) as shown in FIG. 9. If, however, the noise generation potential of the command input was a significant factor in selecting the command input, the RMS command input 70 would likely be selected based on the decreasing peaks in its acceleration frequency spectra curve 75 for higher frequencies (see FIG. 8).

One example of a control system in which the methods according to the present invention could be practiced may allow the user to select a command input from a given group of command inputs by ranking the importance of three characteristics discussed above, i.e., response time, robustness, and noise generation potential. In such a method or system, one or more of robustness, response time, and noise generation could be ranked relative to each other in desirability for a given physical system and, based upon the relative ranking between the various command inputs for those characteristics, a command input could be chosen that is likely to result in an output response having the desired balance of optimization with respect to response time, robustness, and noise generation.

Control systems according to the present invention could be embodied in hardware (chip-based or otherwise), software, or a combination of hardware and software. The control system may be digital, analog, or a combination of digital and analog. The details of implementing the actual control systems employing the concepts of the present invention will be known to those skilled in the art.

Figure 11:
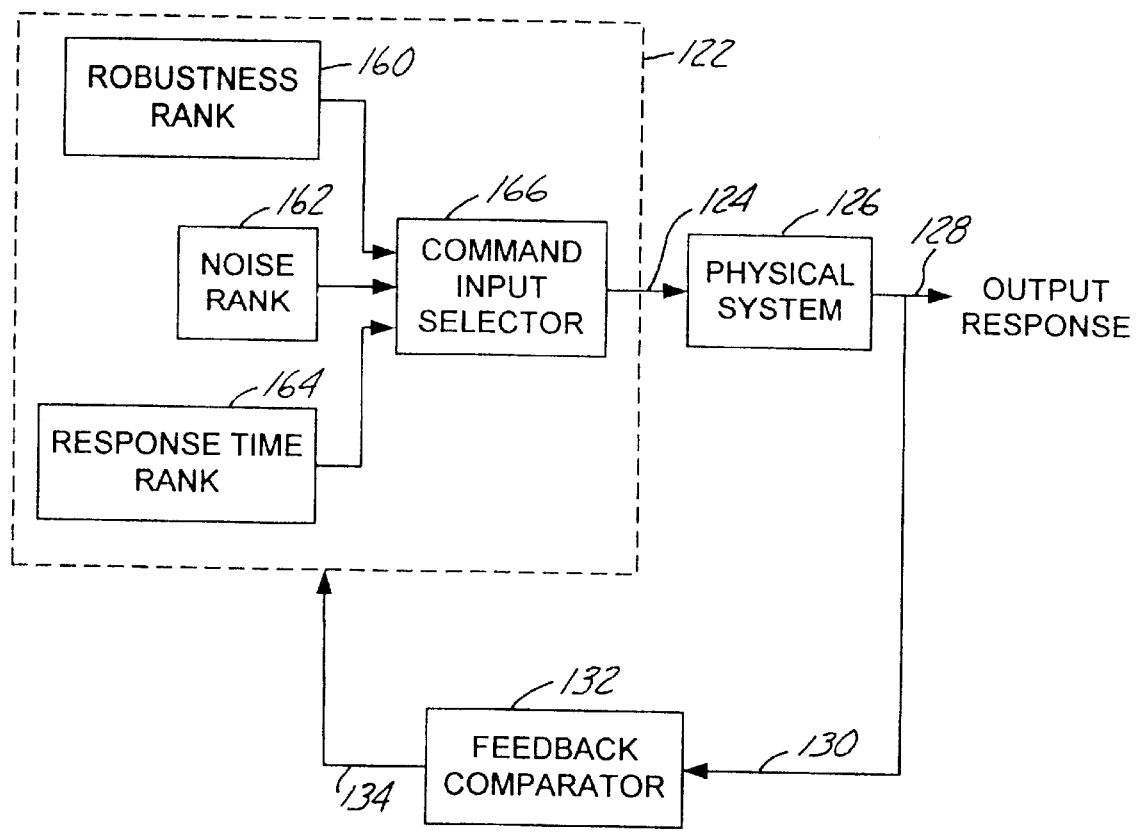
FIG. 11 is a schematic diagram of another system for selecting a command input according to the methods of the present invention.

One example of a system that would allow a command input to be chosen based on ranking of the three characteristics is depicted in FIG. 11. A control system 122 directs a command input 124 to a physical system 126 which then produces an output response 128 as a result of the command input 124. The control system 122 includes a number of components including inputs for ranking each of the three characteristics of robustness 160, noise generation potential 162, and response time 164. Those rankings are provided to a component 166 that, based on the rankings, selects a command input according to the methods of the present invention.

The selection of a command input 124 by the control system 122 could be performed in a variety of manners. For example, the component 166 could start with one or more initial command inputs, e.g., a Posicast command input, and then manipulate that initial command input according to the methods discussed below to arrive at a command input 124 with the desired levels of robustness, noise generation potential, and response time. In such a method, the component 166 would typically include a computational device such as a computer or microprocessor for manipulating the initial command input to arrive at the command input 124 provided to the physical system 126.

Alternatively, where the number of choices of command inputs 124 is limited to a preferred group of command inputs, a look-up table ranking the different command inputs 124 with respect to robustness, noise generation potential, and response time could be employed for the comparisons. Those rankings would preferably be based on analyses of the acceleration frequency spectra of the various command inputs available.

The system depicted in FIG. 11 could also include a feedback loop for monitoring the output response 128 for robustness, noise generation, and response time (similar to the feedback loop described in connection with the system depicted in FIG. 2). The optional feedback loop monitors the output response 128 and provides a feedback signal 130 to a feedback comparator 132. The feedback comparator 132 compares the output response 128 to established criteria to determine whether an adjustment signal 134 is required to adjust the control system 122 such that command input 124 is adjusted to obtain a different output response 128 from the physical system 126 in response to the command input 124. In the system of FIG. 11, the adjustment signal 134 could be used to adjust the rankings of one or more of the characteristics used to select the first command input, i.e., the rankings of robustness, noise generation potential, and response time.

The feedback comparator 132 and the rest of the feedback loop can take many different forms. In more automated systems, the feedback loop may automatically monitor output response 128 and, if the output response 128 falls outside of a desired range for one or more of those characteristics as determined by the feedback comparator 132, an adjustment signal 134 can be directed into the control system 122 to cause the command input 124 to change and, ideally, cause the output response 128 from the physical system 126 to fall within the desired ranges for those factors. The feedback comparator 132 may take the form a computational device such as a computer or microprocessor.

Figure 12:
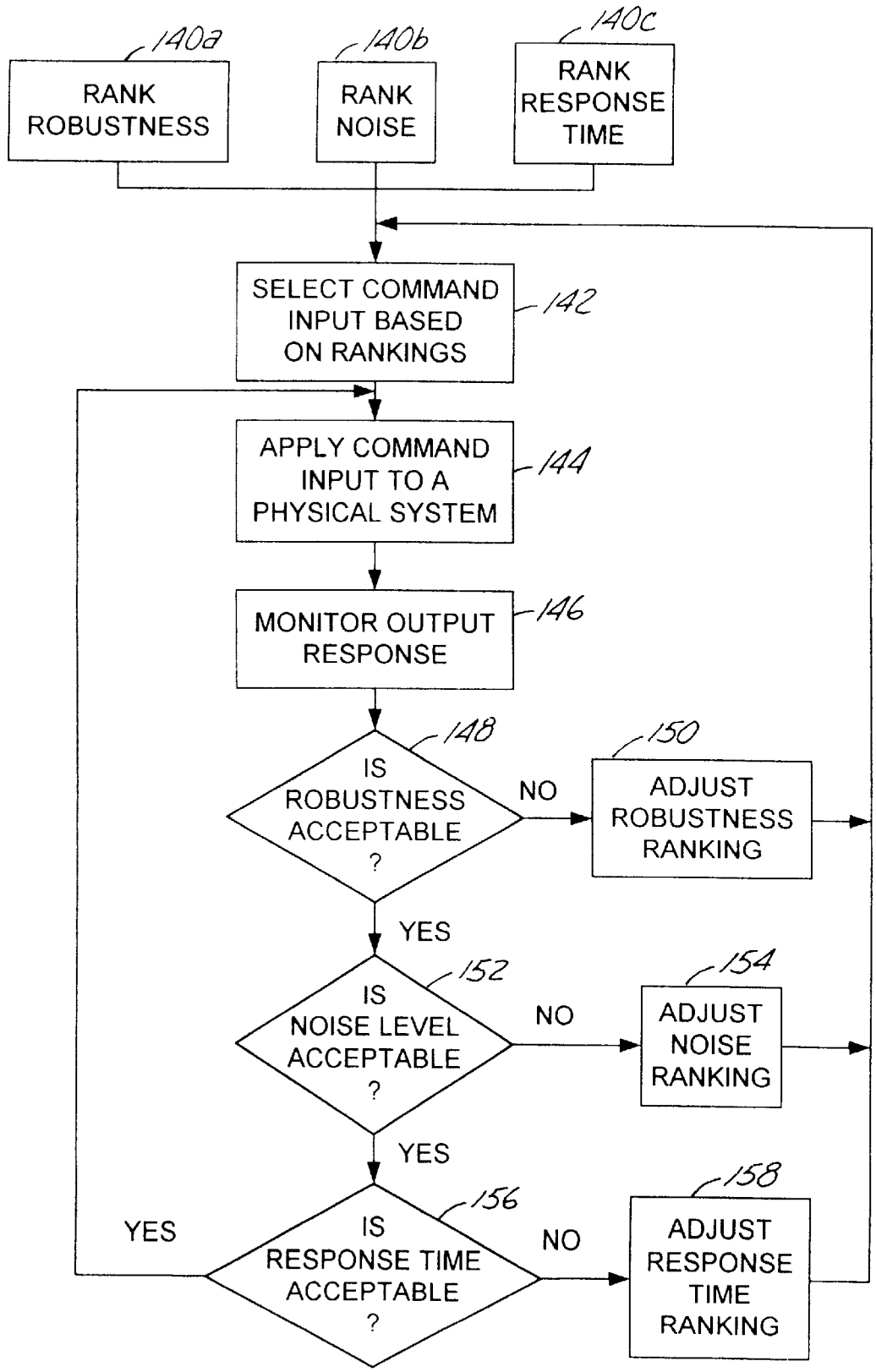
FIG. 12 is a flow diagram of one method of using the system of FIG. 11.

One method of using a system such as that depicted in FIG. 11 is presented in the flow diagram of FIG. 12. The method includes steps 140a, 140b, and 140c in which rankings are selected for each of the three characteristics of robustness, noise generation potential, and response time. The system and method could be set to provide a default value for each of those rankings if no particular rank is selected. Step 142 then comprises selecting a command input based on the rankings. The selection process 142 could include manipulation of one or more initial command inputs according to the present invention, a look-up table, or a combination of a look-up table for selecting an initial command input, followed by manipulation of that initial command input to reach a command input used in connection with the physical system.

After selection of the command input, it is applied to a physical system in step 144. In some methods this will be the last step, i.e., the command input selected based on the rankings is applied to the physical system resulting in an output response. If, however, a feedback loop is provided or the system is actively monitored by a user or designer, the following steps can also form a portion of the method.

Step 146 involves monitoring of the output response of the physical system for robustness, noise, and response time. Step 148 involves a decision as to whether the output response is within a desired range for robustness. If the output response is not providing the desired level of robustness, then step 150 is performed in which the robustness ranking is adjusted and step 142 of selecting the command input and the following steps are repeated in an attempt to improve the robustness of the output response.

If the robustness is determined to be within the desired range in step 148, then a decision 152 is made as to whether the noise generated by the physical system in response to the command input is within acceptable limits. If it is not, then step 154 is performed in which the ranking of noise generation potential is adjusted and step 142 of selecting the command input and the following steps are repeated in an attempt to adjust the noise generated by the physical system.

If the noise generated by the physical system is determined to be within the desired range in step 152, then a decision 156 is made as to whether the response time of the physical system is within acceptable limits. If it is not, then step 158 is performed in which the ranking of response time is adjusted and step 142 of selecting the command input and the following steps are repeated in an attempt to adjust the response time of the physical system.

In the methods and systems described above, a step or apparatus for selecting a command input is included. As discussed, the selection of a command input can be performed by the manipulation techniques described in more detail below. Also described above is the selection of a command input from a group of preferred command inputs that are provided in the system. Even in that process, it may be desirable to provide one or more of the available command inputs by the manipulation techniques discussed below.

In any control system in which the available command inputs are preselected, it is preferred that the available command inputs provide varying levels of performance with respect to one or more of robustness, noise generation potential, and response time. By providing a varied selection, the control system can be used in a wide variety of applications in which a variety of characteristics are desirable.

One useful group of command inputs that could be preselected for a control system could include the OMC, RMS, ATS, and PI4 command inputs (which are all described in detail below). If a system included all or some of these command inputs, they could be ranked for robustness, noise generation potential and response time as follows:

| Ranking | Robustness | Noise | Response Time |
| --- | --- | --- | --- |
| 1 | PI4 | PI4 | OMC (1.5 $T_n$) |
| 2 | RMS | RMS | RMS/ATS (2 $T_n$) |
| 3 | OMC/ATS | OMC/ATS | PI4 (2.5 $T_n$) |

The rankings in the areas of robustness and noise generation potential are provided by analyzing the acceleration frequency spectra of the various command inputs as discussed above. It should be understood that, to some degree, such rankings are subjective and may not be empirically correct. As a result, some modification of the rankings may be required for any particular physical system to which the command inputs are to be applied.

Deriving New Command Inputs

The methods of deriving new command inputs according to the present invention will typically rely on the processing or manipulation of an initial command input to obtain an intermediate command input or waveform. The processing involves substitution of the function defining the initial command input into a step function equation as set forth below. The intermediate command input or waveform is then integrated over the command input period at least once to obtain the final command input. Specific methods involving a single, double and quadruple integration will be discussed below, followed by a more general discussion of the methods of selecting final command inputs according to the present invention.

Single Integration Method

The equation used to process the initial command input can be expressed as follows for the single integration RVS method in which the initial command input, p(t), with an initial command input period (time length of the command input), T, must be substituted into Equation 1 below to obtain the equation, $p_d(t)$, for the intermediate waveform (where $\phi(t)$ is a Heavyside Unit Step Function):

$$p_d(t) = \frac{p(t)\phi(t) - p(t-T)\phi(t-T)}{T} \quad (1)$$

Then to obtain the final command input waveform, pn(t), Equation (1) must be substituted into Equation (2) below:

$$p_n(t) = \int_0^t p_d(t)\,dt \quad (2)$$

This integration process smoothes the initial command input which leads to improved robustness properties. The improved robustness does, however, increase the command input period, i.e., the period of time over which the system makes the desired move or executes the command input. That increase can be seen with reference to the illustration provided below.

Figure 13:
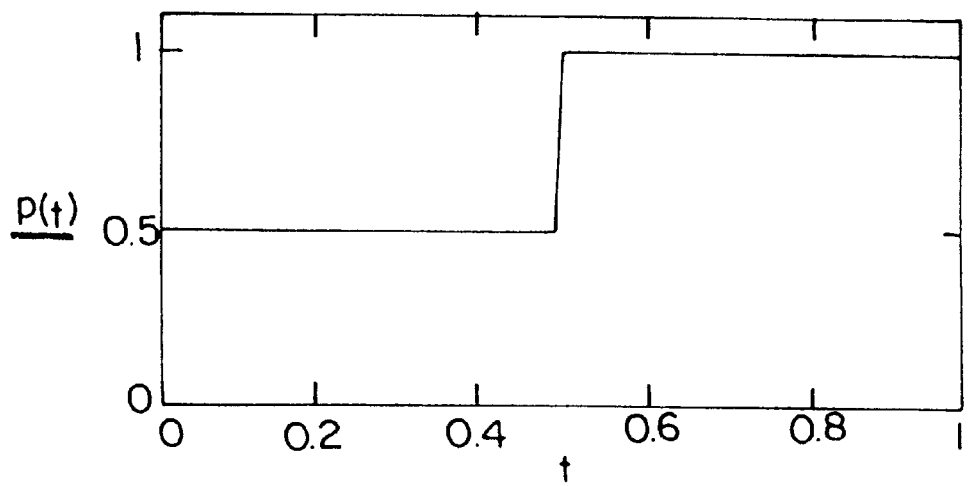
FIG. 13 is a plot illustrating a waveform of one initial command input to be processed according to one method of the present invention.

Referring now to FIG. 13, the initial command input comprises the command input commonly referred to as Posicast which can be represented by Equation (3) below:

$$p(t) = 0.5\phi(t) + 0.5\phi(t-T) \quad (3)$$

where T=0.5 $T_n$. As shown in FIG. 13, the initial waveform represents a two-step function similar to those referred to as "Posicast" functions involving an initial step at time t=0, followed by a second step at time t=0.5 (thereby giving the result that T=0.5 $T_n$).

Figure 14:
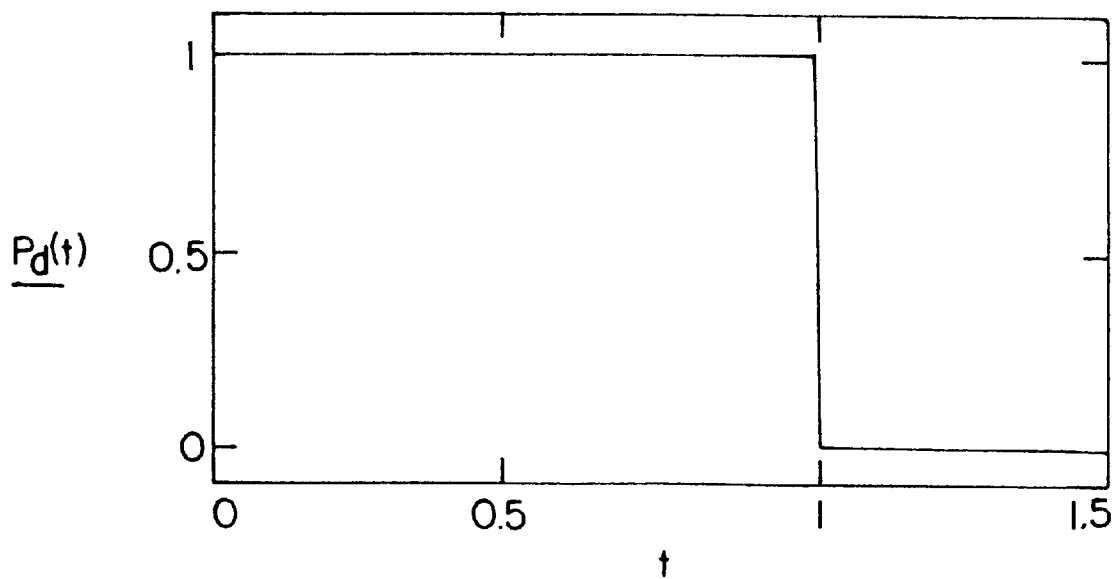
FIG. 14 is a plot of the intermediate command input waveform derived from the waveform of FIG. 13 according to one method of the present invention.

Substituting Equation (3) into Equation (1) above yields the resulting intermediate waveform (represented as $p_d(t)$) depicted in FIG. 14). That intermediate waveform can then be integrated using Equation (2) to yield the resulting final command input, $p_n(t)$, as depicted in FIG. 15.

Figure 15:
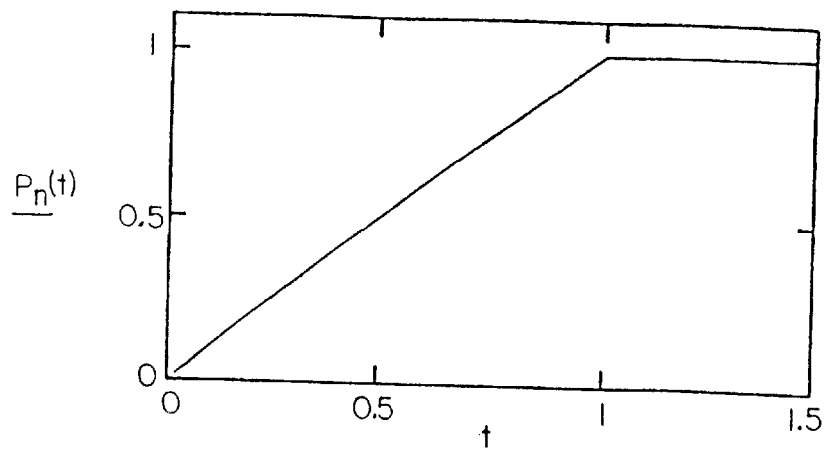
FIG. 15 is a plot of the final command input obtained by integrating the waveform of FIG. 14 according to one method of the present invention.

The command input in FIG. 15 is essentially a ramp and hold command input. This command input exhibits improved robustness as compared to the two-step function provided in the initial (Posicast) command input, but has a command input period (i.e., period required to complete the move) of T=$T_n$ as opposed to the period of the initial command input, i.e., T=0.5 $T_n$.

In another example of the method according to the present invention, the ability of the method to improve robustness in an already generally robust command input will be demonstrated. This example begins with a command input that will be referred to as a "One Minus Cosine" (OMC) command input that can be represented by the following equation:

$$p(t) = \frac{1 - \cos\left(\pi \frac{t}{T}\right)}{2}\phi(t) + \frac{1 - \cos\left(\pi \frac{t-T}{T}\right)}{2}\phi(t-T) \quad (4)$$

where the command input period, T, is 1.5 $T_n$. This command input is represented by the position plot depicted in FIG. 16. The OMC command input is a generally smooth curve which is generally robust, i.e., the OMC command input provides relatively low levels of residual vibration in the system.

Figure 17:
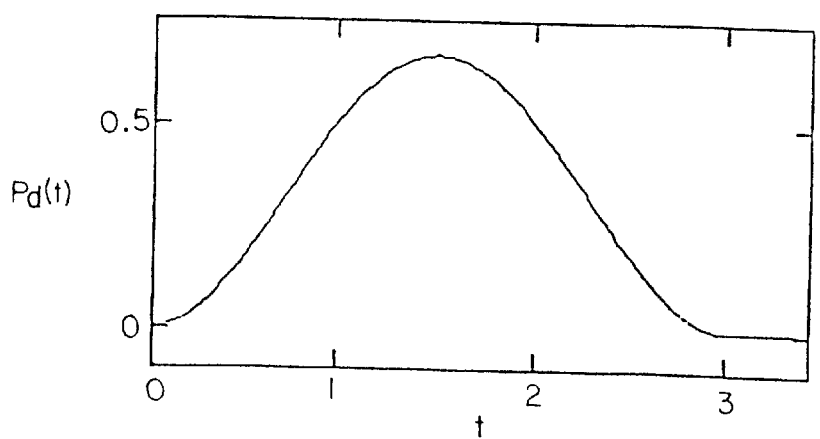
FIG. 17 is a plot of the intermediate command input waveform derived from the waveform of FIG. 16 according to one method of the present invention.
Figure 18:
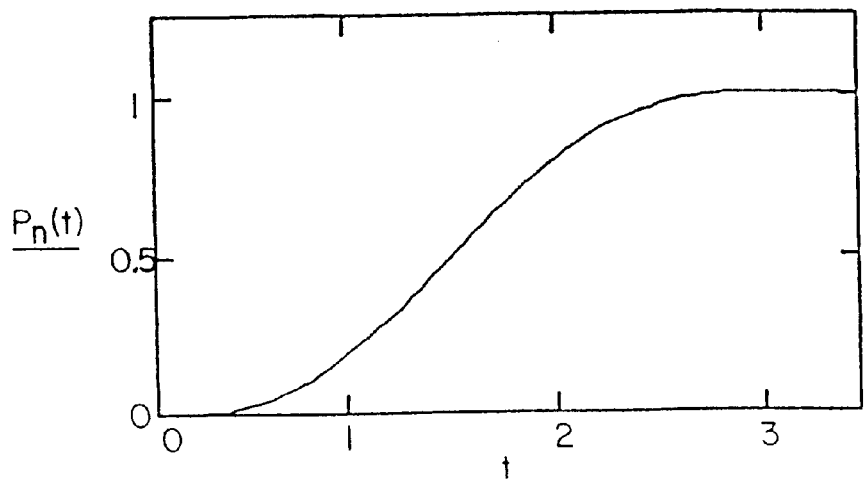
FIG. 18 is a plot of the final command input obtained by integrating the waveform of FIG. 17 according to one method of the present invention.

The OMC command input equation, Equation (4) above, is then substituted into Equation (1) above to obtain the intermediate waveform. A plot of the intermediate waveform is depicted in FIG. 17 where it can be seen that the command input period T is increased to 3 $T_n$ from the initial command input period of 1.5 $T_n$ of the OMC command input. The equation resulting from the substitution of Equation (4) into Equation (1), represented by the intermediate waveform depicted in FIG. 17, is then integrated using Equation (2) above to obtain the final command input, pn(t). A plot of the final command input is depicted in FIG. 18 (and can be referred to as a Ramp Minus Sine (RMS) command input).

The RMS command input can be represented by Equation (5) below:

$$p_{\text{rms}}(t) = \left[\frac{t}{T} - \frac{\sin\left(2\pi\frac{t}{T}\right)}{2\pi}\right]\phi(t) - \left[\frac{t-T}{T} - \frac{\sin\left(2\pi\frac{t-T}{T}\right)}{2\pi}\right]\phi(t-T) \quad (5)$$

Figure 19:
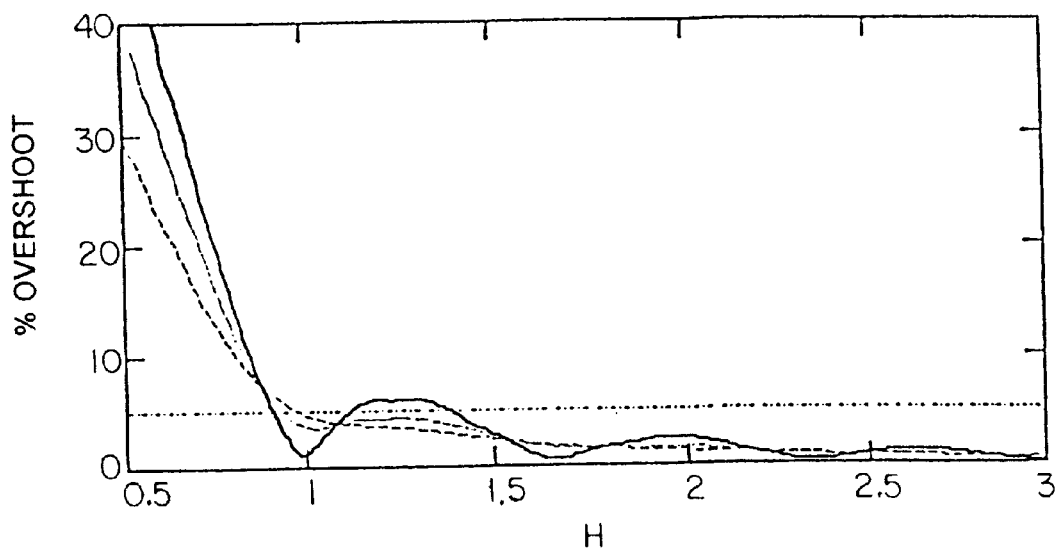
FIG. 19 is a plot of the percent overshoot in the output responses for a system with three levels of damping when using the final command input of FIG. 16.
Figure 20:
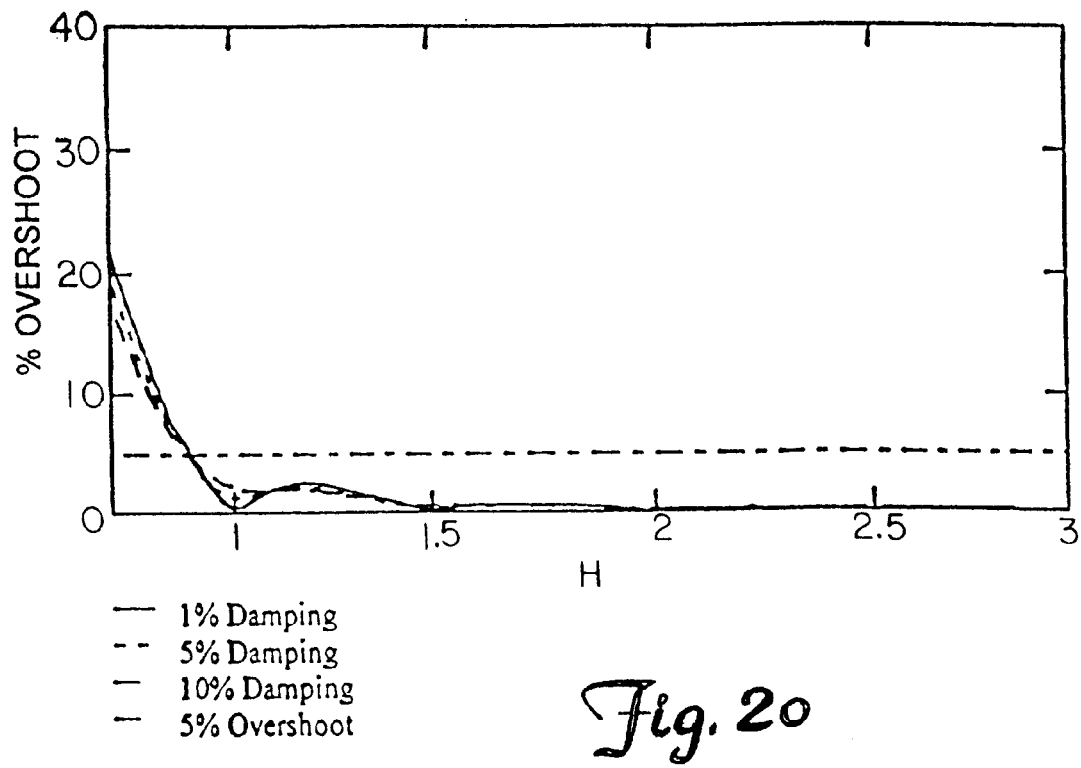
FIG. 20 is a plot of the percent overshoot in the output responses for a system with three levels of damping when using the final command input of FIG. 18.

The ability of the method according to the present invention to provide a final command input with improved robustness can be represented in the plots of FIGS. 19 & 20. It should be noted that the plots in FIGS. 19 & 20 have been normalized such that the x-axis, represented by H, is obtained by normalizing the command input period relative to the natural period of the system, i.e., $H=T/T_n$.

Figure 16:
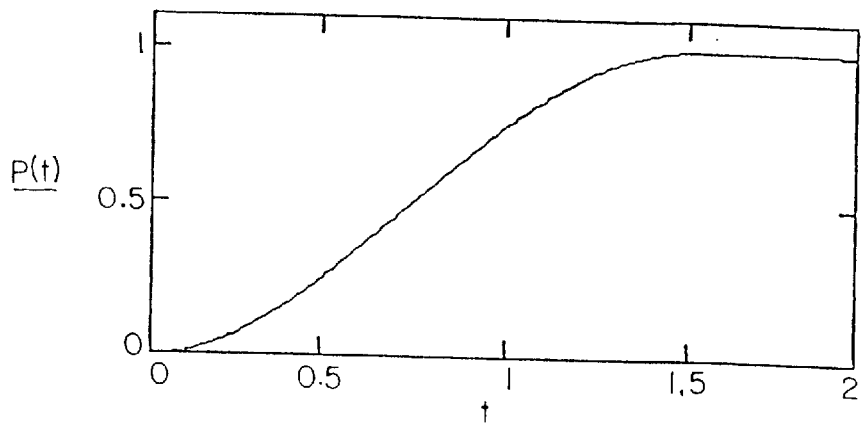
FIG. 16 is a plot illustrating a waveform of another initial command input to be processed according to one method of the present invention.

FIG. 19 is a plot of the percent overshoot in an output response for a system using the OMC command input of FIG. 16, with the output response being plotted for three levels of system damping. As can be seen, the OMC command input provides generally good robustness at all damping levels, with the percent overshoot rising above 5% for only the 1% damped system, and then only for a small portion of the region to the right of H=1.

Although the robustness of systems using the OMC command input is generally good, it can be seen from FIG. 20 that the robustness of the RMS command input of FIG. 18 and Equation (5) is even better. As depicted in FIG. 20, the overshoot levels in the output response for systems having 1, 5, or 10 percent damping never rise above the 5% overshoot threshold.

Figure 21:
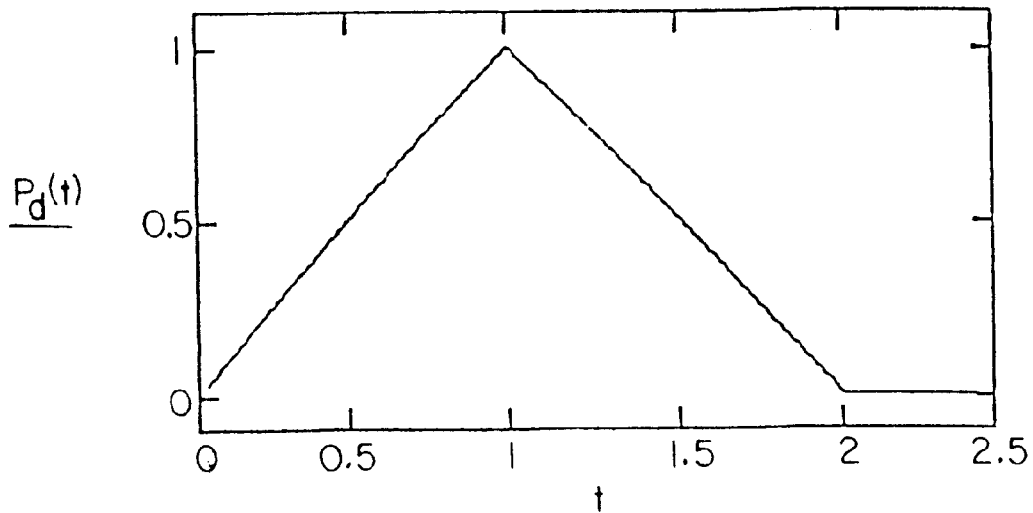
FIG. 21 is a plot of the intermediate command input waveform derived from the waveform of FIG. 15 according to one method of the present invention.

Another example of the method according the present invention can be demonstrated by using the final command input depicted in FIG. 15 above, i.e., a ramp and hold command input as the initial command input. If the function representing that command input is substituted into Equation (1) above, an intermediate waveform as depicted in FIG. 21 is obtained. The command input period $T=T_n$ for the ramp and hold command input is increased to 2 $T_n$ for the resulting intermediate waveform as well as the final command input depicted in FIG. 22. As in the examples presented above, the equation resulting from the substitution of equation representing the ramp and hold command input waveform into Equation (1), represented by the intermediate waveform depicted in FIG. 21, is then integrated using Equation (2) above to obtain the final command input, $p_n(t)$ depicted in FIG. 22.

Figure 22:
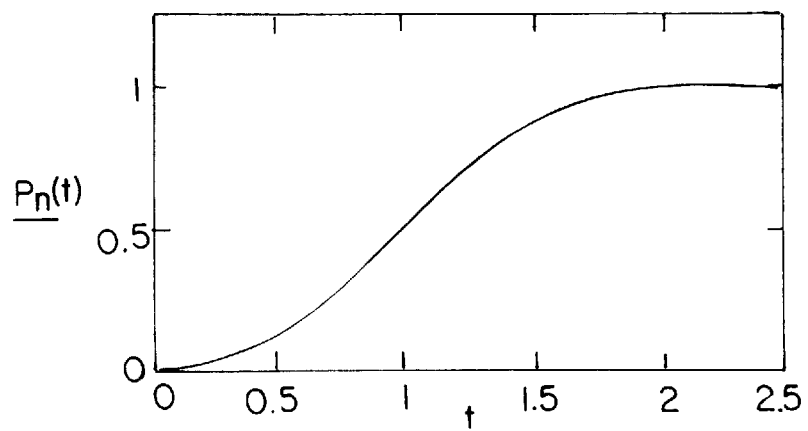
FIG. 22 is a plot of the final command input obtained by integrating the waveform of FIG. 21 according to one method of the present invention.

The command input depicted in FIG. 22 will be referred to herein as an "ATS" command input because it is derived from a simple parabola defined by the equation $A(t^2)$ (i.e., Amplitude Time Squared). Equation 5A below defines the ATS command input:

$$s_{ATS}(t)=s_o[t^2\phi(t)-2(t-T_n)^2\phi(t-T)+(t-2T_n)^2\phi(t-2T_n)] \quad (5A)$$

where $s_o \frac{1}{2} T_n^2 = f_n^2/2$.

All of the methods and examples discussed above have illustrated one embodiment of the methods according to the present invention, i.e., a method in which the intermediate command input is determined by substituting the equation representing the initial command input into Equation (1) and integrating the resulting intermediate waveform once according to Equation (2).

As indicated above, however, the methods according to the present invention can be extended further to include methods in which the intermediate waveform is integrated two or more times. In every method, however, the equation representing the initial command input must be processed according to a step function equation to provide an intermediate waveform which can then be integrated one or more times to obtain the final command input.

In general, more integrations lead to greater smoothness of the final command input and often improve noise and robustness characteristics in the output response of the system. The improvement in the noise and robustness characteristic must, however, be balanced with an increase in the period or time required to complete the move. The length of the command input period increases with each integration (represented by n) according to Equation (6) presented below:

$$T_{new}=T_{original}(n+1) \quad (6)$$

As a result, the designer must consider whether the increase in robustness is important enough to offset the corresponding increase in command input period required to obtain the improved robustness.

An additional advantage of the methods according to the present invention is the ability to obtain a final command input that can be synthesized that reduce oscillations over a wide bandwidth. This makes the present invention very useful in connection with physical systems having multiple degrees of freedom.

The intermediate waveform and equation are obtained by substituting the initial command input equation into the step function equation represented by Equation (7):

$$b(t) = \frac{1}{T_{orig}^n} \sum_{i=0}^{n} D_{n,i}(t - iT_{orig})\phi(t - iT_{orig}) \quad (7)$$

Equation (7) provides the intermediate waveform using summation and Heavyside step functions ($\phi$). The variable, n, represents the number of integrations that will be performed to obtain the final command input. The coefficients, D, used in Equation (7) are obtained from Pascal's Triangle (which is derived from a binomial expansion) and is presented below for values of n=0 to 7:

| n | | | | | | | | |
|---|---|---|---|---|---|---|---|---|
| 0 | 1 | 0 | 0 | 0 | 0 | 0 | 0 | 0 |
| 1 | 1 | −1 | 0 | 0 | 0 | 0 | 0 | 0 |
| 2 | 1 | −2 | 1 | 0 | 0 | 0 | 0 | 0 |
| 3 | 1 | −3 | 3 | −1 | 0 | 0 | 0 | 0 |
| 4 | 1 | −4 | 6 | −4 | 1 | 0 | 0 | 0 |
| 5 | 1 | −5 | 10 | −10 | 5 | −1 | 0 | 0 |
| 6 | 1 | −6 | 15 | −20 | 15 | −6 | 1 | 0 |
| 7 | 1 | −7 | 21 | −35 | 35 | −21 | 7 | −1 |

Moving down the matrix presented above provides the coefficients to be used in connection with Equation (7) based on the number of integrations desired to be performed. In other words, for the single integration method described above n=1 and the second row of coefficients (i.e., 1, −1, 0, 0, 0, 0, 0, 0) is substituted for D in Equation (7) to yield the resulting Equation (1) presented above. Methods incorporating more integrations will use coefficients from rows farther down the matrix, e.g., a double integration method will use the coefficients in the row where n=2 while a triple integration method will use the coefficients in the row where n=3.

Double Integration Method

As a further example of the methods according to the present invention, a double integration method will be described which, like the single integration method described above, also provides command inputs that improve the noise and robustness characteristics in system output responses. For the method involving double integration to obtain a final command input according to the present invention, the equation, p(t), with a period of T, representing the initial command input must be substituted into the following equation (obtained from Equation (7) above):

$$p_{dd}(t) = \frac{p(t)\phi(t) - 2p(t-T)\phi(t-T) + p(t-2T)\phi(t-2T)}{T^2} \quad (8)$$

The result, $p_{dd}(t)$, of that substitution is then integrated first as represented by the following equation:

$$p_d(t) = \int_0^t p_{dd}(t)\,dt \quad (9)$$

The resulting function, $p_d(t)$ is then integrated a second time according to Equation (2) presented above to obtain the final command input which can be represented as $p_n(t)$.

The double integration method according to the present invention provides final command inputs with even greater improvements in robustness as compared to the single integration method. These improvements do, however, come at the cost of an even more extended command input period. An example of the double integration method will now be discussed to illustrate this method.

The two-step Posicast command input function discussed in the first example above will be used here to illustrate the improved robustness provided by the double integration method as well as the corresponding increase in the final command input period that accompanies the improvement in robustness. The initial command input, represented by p(t), with T=0.5 $T_n$, can be plotted as depicted in FIG. 13.

Figure 23:
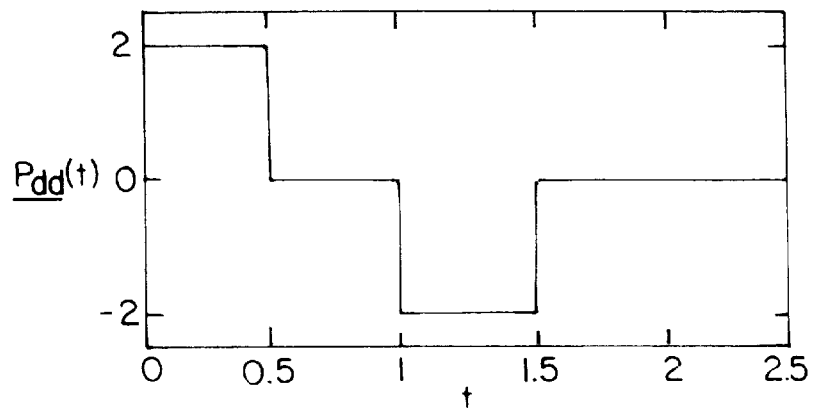
FIG. 23 is a plot of the intermediate command input waveform derived from the waveform of FIG. 13 according to another method of the present invention.
Figure 24:
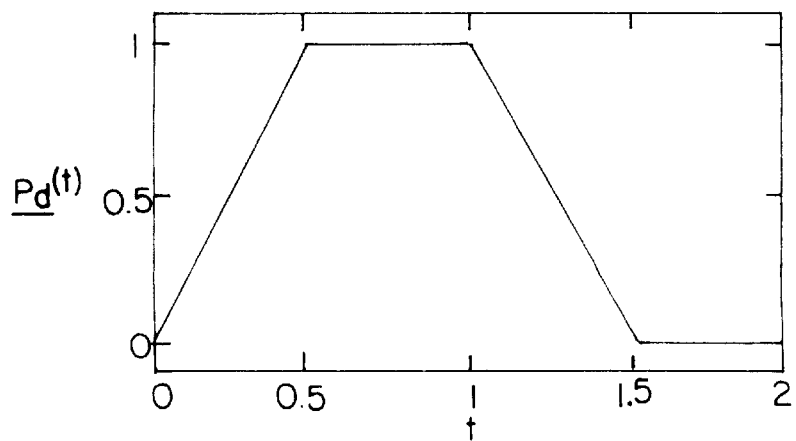
FIG. 24 is a plot of the second intermediate command input waveform obtained by integrating the waveform of FIG. 23 according to one method of the present invention.

The initial command input p(t) is then substituted into Equation (8) above to obtain the intermediate function $p_{dd}(t)$ represented by the waveform depicted in FIG. 23. The intermediate command input function $p_{dd}(t)$ is then integrated first using Equation (9) to obtain a second intermediate command input function $p_d(t)$ which is represented by the waveform depicted in FIG. 24. Finally, the second intermediate command input represented by $p_d(t)$ is integrated according to Equation (2) above, which yields the final command input, represented by $p_n(t)$ and plotted in FIG. 25.

Figure 25:
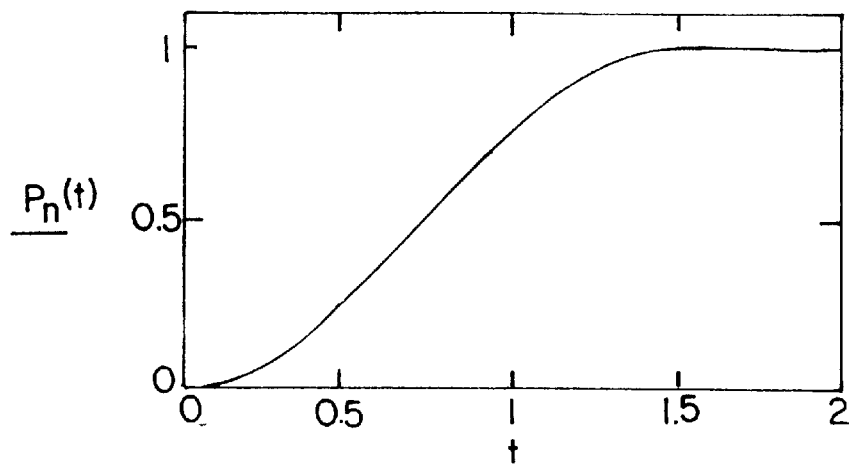
FIG. 25 is a plot of the final command input obtained by integrating the waveform of FIG. 24 a second time according to one method of the present invention.

As seen in FIG. 25, the final command input period is increased to 1.5 T, from the initial command input period of 0.5 $T_n$, i.e., the final command input period is increased three times over the initial command input period.

Quadruple Integration Method

As a further example of the methods according to the present invention, a method involving the use of four integrations will be described which, like the single and double integration methods described above, also provides command inputs that improve the robustness in system output responses. For the method involving quadruple integration to obtain a final command input according to the present invention, the equation, p(t), with a period of T, representing the initial command input must be substituted into Equation (7) above. The initial command input is a two-step Posicast command input function as discussed in the first example above. That initial command input will be used here to illustrate the improved robustness provided by the quadruple integration method as well as the corresponding increase in the final command input period that accompanies the improvement in robustness.

The initial command input, represented by p(t), with T=0.5 $T_n$, can be plotted as depicted in FIG. 13. In this example, the amplitude is three, i.e., A=3. Because four integrations will be performed, we know from Equation (6) above that the final command input period will be 2.5 ($T_n$).

Figure 26:
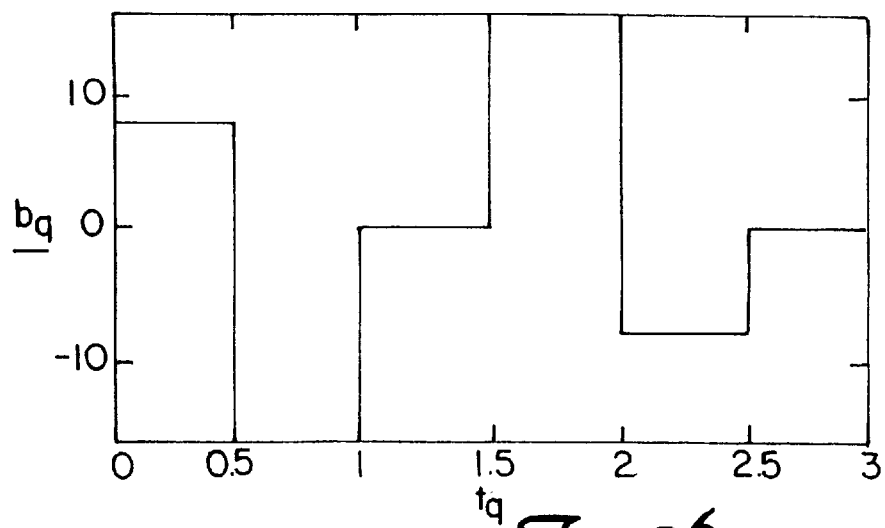
FIG. 26 is a plot of the first intermediate command input waveform derived from the waveform of FIG. 13 according to another method of the present invention.
Figure 27:
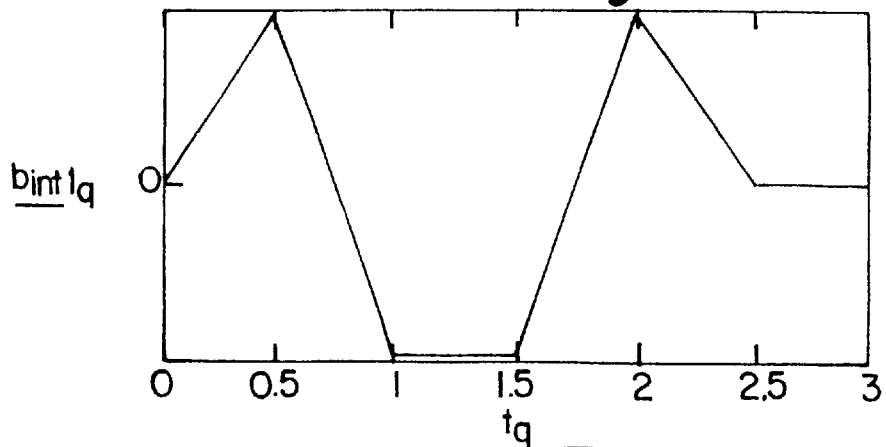
FIG. 27 is a plot of the second intermediate command input waveform obtained by first integration of the waveform in FIG. 26 according to one method of the present invention.
Figure 28:
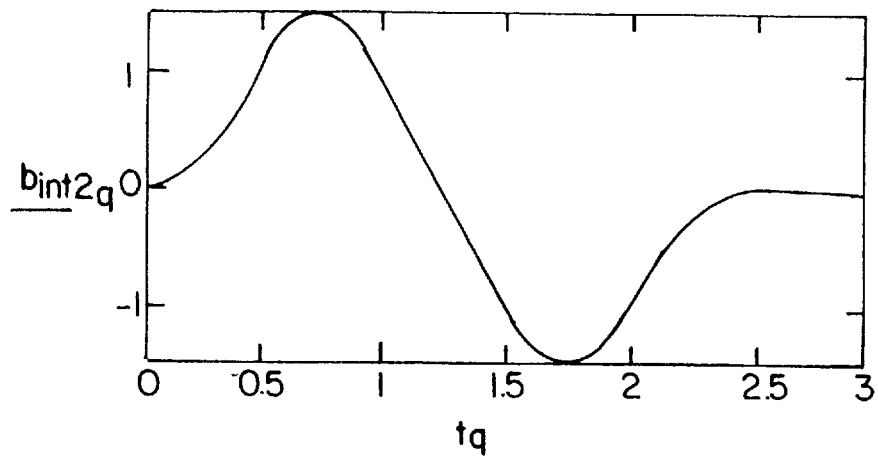
FIG. 28 is a plot of the third intermediate command input waveform obtained by second integration of the waveform in FIG. 26 according to one method of the present invention.
Figure 29:
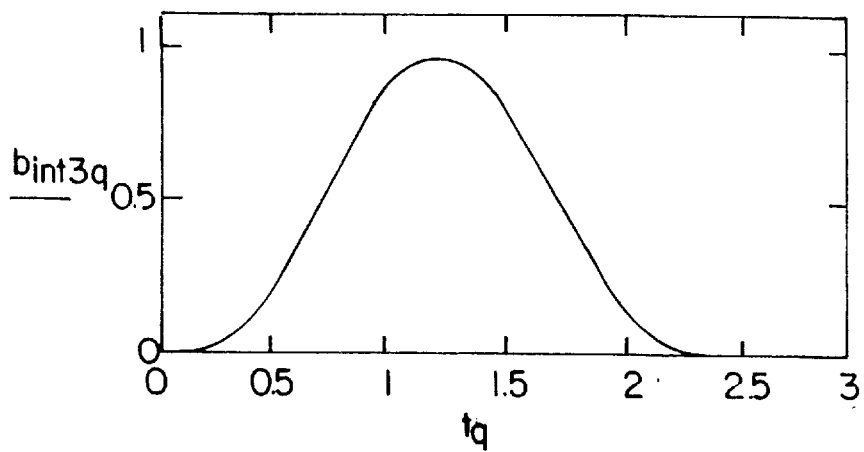
FIG. 29 is a plot of the fourth intermediate command input waveform obtained by third integration of the waveform in FIG. 26 according to one method of the present invention.

The initial command input p(t) is then substituted into Equation (7) above to obtain the first intermediate waveform depicted in FIG. 26. The first intermediate waveform of FIG. 26 is then integrated using Equation (2) to obtain a second intermediate command input which is represented by the waveform depicted in FIG. 27. This completes the first integration. The second intermediate command input represented in FIG. 27 is integrated according to Equation (2) to obtain the third intermediate command input waveform depicted in FIG. 28. This completes the second integration. The third intermediate command input waveform of FIG. 28 is then integrated again to obtain the third intermediate command input waveform depicted in FIG. 29. This completes the third integration. Finally, the fourth intermediate command input waveform depicted in FIG. 29 is integrated according to Equation (2) to obtain the final command input depicted in FIG. 30. This command input will be referred to below as the "PI4" command input (Posicast Integrated 4 times) and can be expressed as Equation (10) below:

$$PI4(t) = \frac{1}{3}t^4\phi(t) - (t - 0.5T_n)^4\phi(t - 0.5T_n) = \frac{2}{3}(t - T_n)^4\phi(t - T_n) + \quad (10)$$
$$\frac{2}{3}(t - 1.5T_n)^4\phi(t - 1.5T_n) - (t - 2T_n)^4\phi(t - 2T_n) +$$
$$\frac{1}{3}(t - 2.5T_n)^4\phi(t - 2.5T_n)$$

Figure 30:
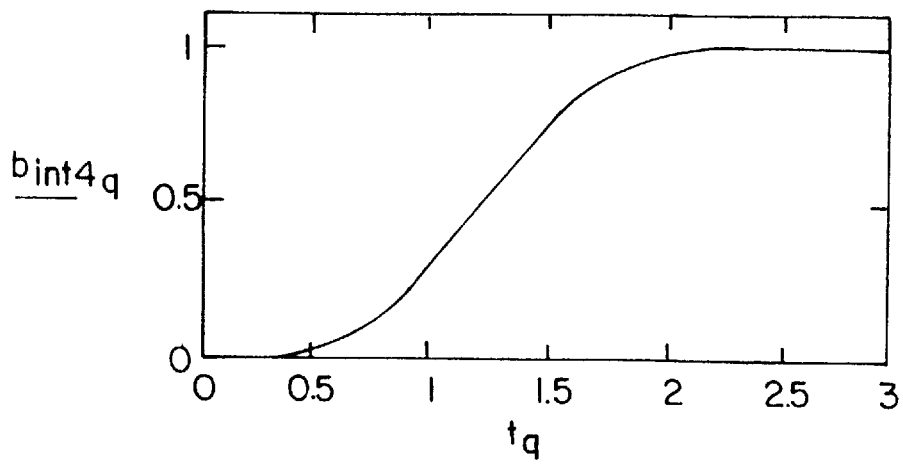
FIG. 30 is a plot of the final command input obtained by fourth integration of the waveform in FIG. 26 according to one method of the present invention.

As seen in FIG. 30, the PI4 command input period is increased to 2.5 $T_n$ from the initial Posicast command input period of 0.5 $T_n$, i.e., the PI4 command input period is increased five times over the initial Posicast command input period.

The benefits of that increase in command input period can be demonstrated by the following example in which the output responses of a multiple degree of freedom system is acted on by a two-step Posicast command input and a PI4 command input.

The system itself could be an electrical, mechanical, or electromechanical system with or without a control system where:

$$\zeta = 0.01 \quad (11)$$
$$\omega_{n1} = 2\pi$$
$$\omega_{n2} = 2\pi 1.25$$

-continued $$\frac{output\ (s)}{input\ (s)} = \frac{1}{2}\left[\frac{2\zeta\omega_{n1}s + \omega_{n1}^2}{s^2 + 2\zeta\omega_{n1}s + \omega_{n1}^2} + \frac{2\zeta\omega_{n2}s + \omega_{n2}^2}{s^2 + 2\zeta\omega_{n2}s + \omega_{n2}^2}\right]$$

Figure 31:
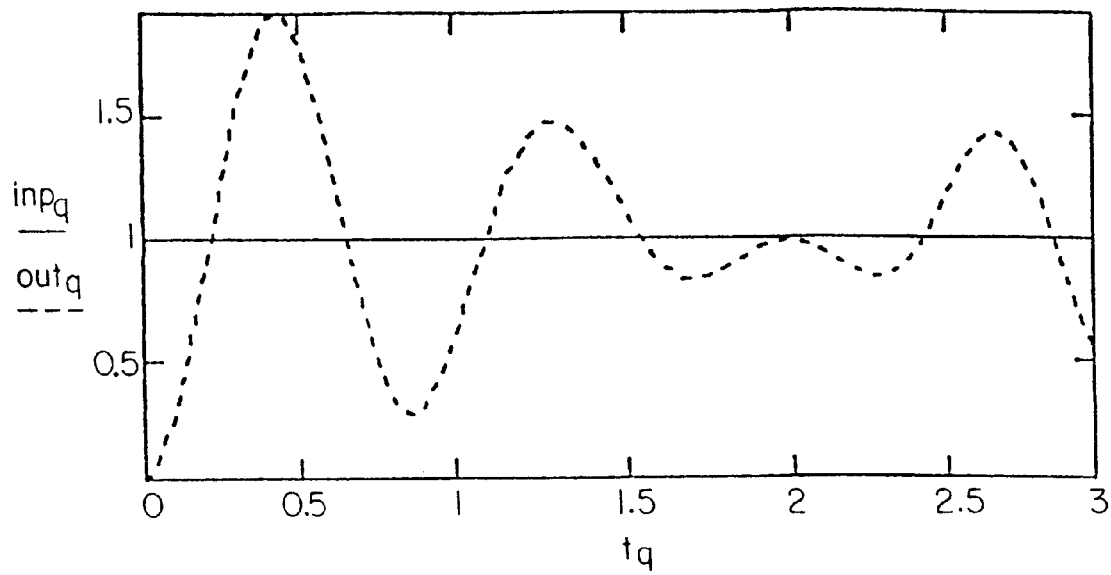
FIG. 31 is a plot of the output response of a multiple degree of freedom oscillatory system to a step input of one.
Figure 32:
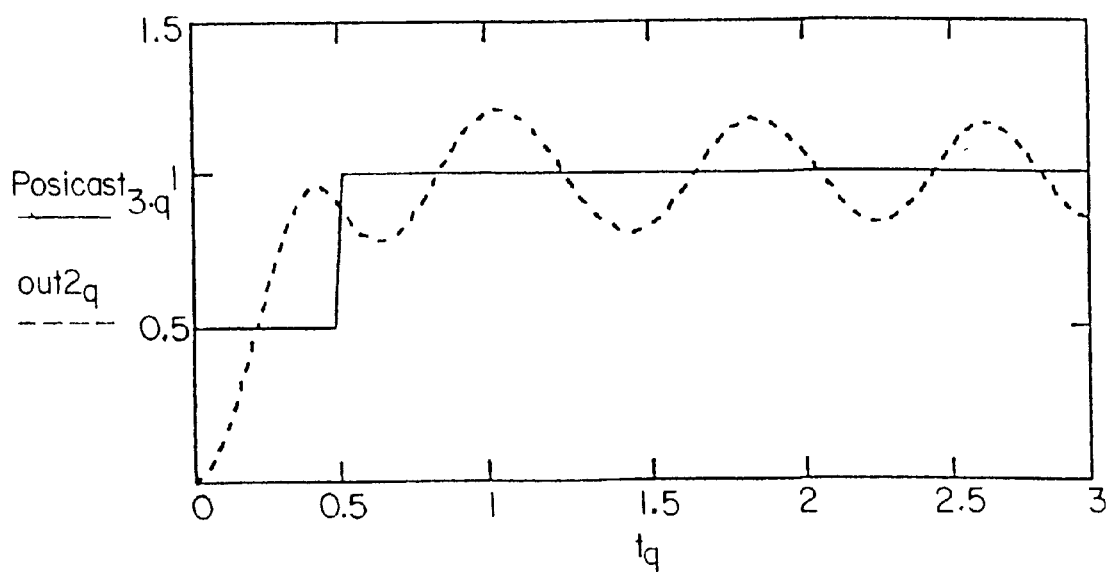
FIG. 32 is a plot of the output response of the oscillatory system used to obtain the results of FIG. 31 with a two-step Posicast command input.

The response of the system identified by the above information to a step input of one is plotted in FIG. 31. The response of the same system to a two-step Posicast command input is depicted by the broken line in FIG. 32. It should be noted that in this example, the Posicast command input was tuned to the system's lowest natural frequency which should yield the best response. As shown, the two-step Posicast command input is not capable of effectively handling a multiple degree of freedom system as evidenced by the significant residual motion or variation in the output response at the end of the command input period (0.5 $T_n$) as well as for a significant time after that point.

Figure 33:
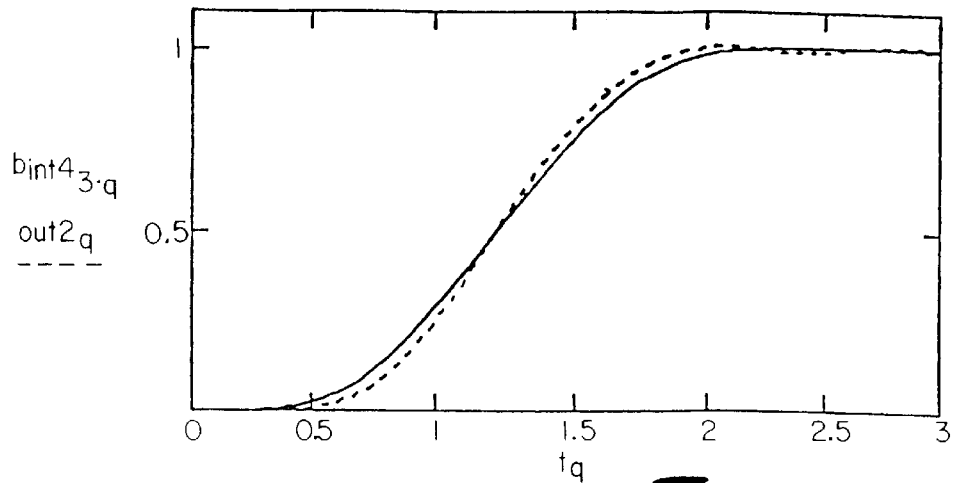
FIG. 33 is a plot of the output response of the oscillatory system used to obtain the results of FIGS. 31 & 32 with a command input as depicted in FIG. 30.

The response of the same system to a PI4 command input is illustrated by the broken line in FIG. 33. The system output response exhibits relatively small residual motion or variation at the end of the command input period (2.5 $T_n$). The command input period, $T_p$, can be simply set to 2.5 times the natural period ($T_n$) of the physical system in which it is used and, because the PI4 command input is effective over a wide bandwidth, the system residual vibration is significantly reduced as compared to responses obtained when, e.g., a Posicast command input is used with the same system.

This simplified tuning process, i.e., that the PI4 control system requires only rough tuning to the lowest natural frequency of the physical system, is a significant advantage in that only one adjustment needs to be made in a relatively short period of time. This is especially true as compared to control systems and methods in which multiple interrelated adjustments are required to tune the system to reduce residual vibrations.

Figure 34:
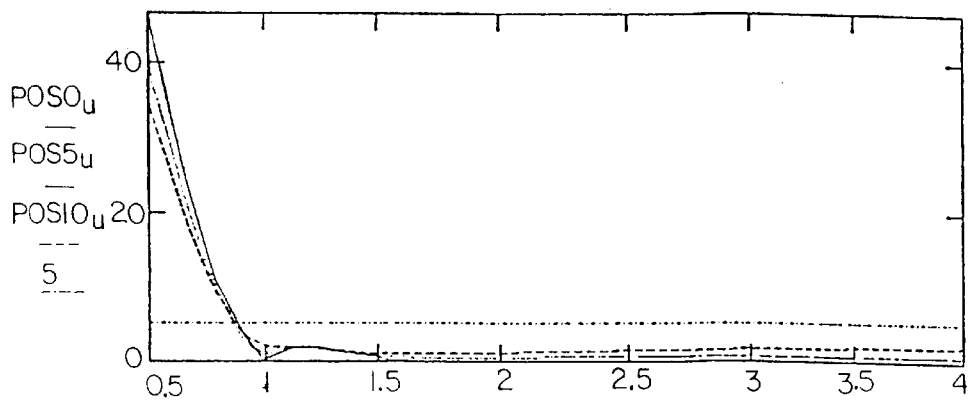
FIG. 34 is a plot of the percent overshoot in the output responses for the oscillatory system used to obtain the results of FIGS. 31–33 with 0%, 5%, and 10% damping when using the command input of FIG. 30.

FIG. 34 is a robustness plot of the percent overshoot in an output response for a system using the command input of FIG. 33 with the output response being plotted for three levels of damping. As can be seen, the command input provides generally good robustness at the values of damping shown, i.e., 0%, 5%, and 10%, with the percent overshoot never rising above 3% for any of the plotted curves before settling.

Figure 35:
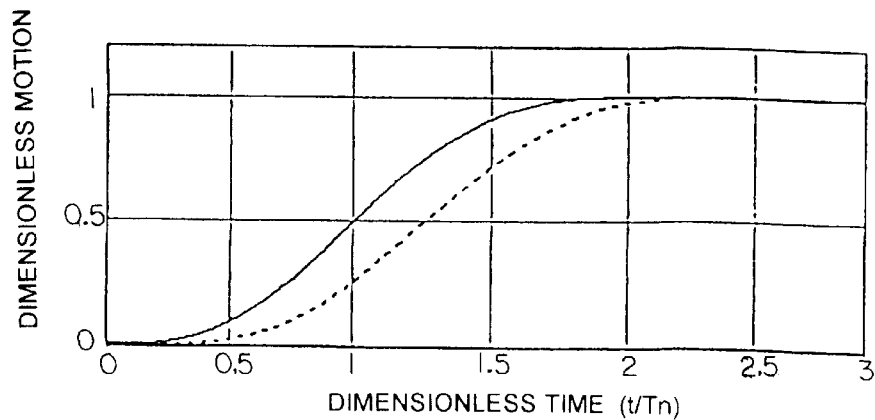
FIG. 35 is a composite plot of a PI 4 command input and a RMS command input.

The PI4 command input developed according to the methods of the present invention offers additional advantages over even the RMS command input (see, e.g., FIG. 5) for noise reduction. The two command inputs are plotted together in FIG. 35 with the PI4 command input being plotted as a broken line and the RMS command input being represented by the solid line. FIG. 35 illustrates the increased period of the PI4 command input (2.5 $T_n$) as compared to the RMS command input (2 $T_n$).

Figure 36:
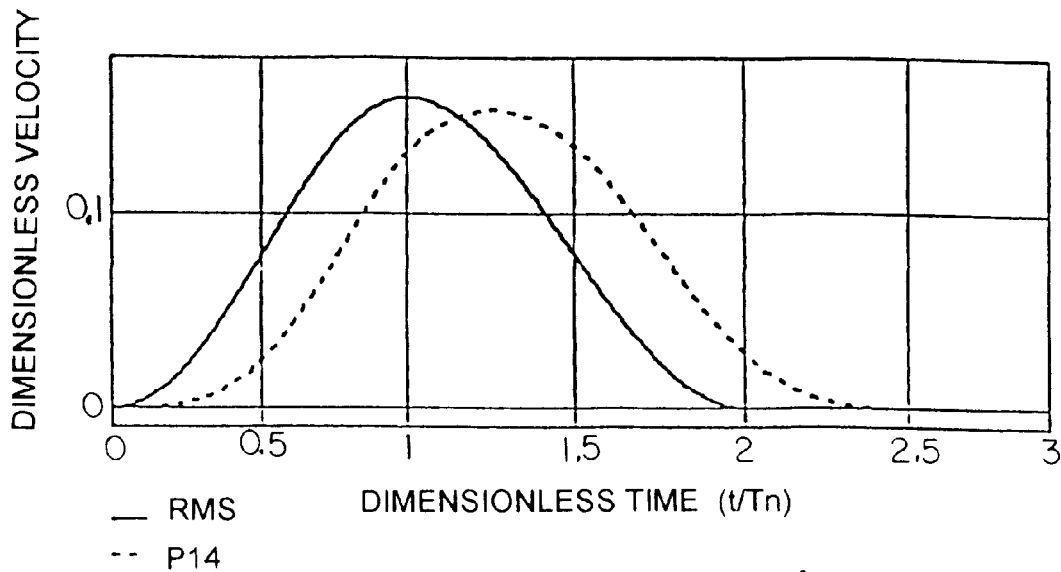
FIG. 36 is a composite plot of the velocity profiles for the command inputs depicted in FIG. 35.

FIG. 36 is a plot of the first derivative of each of the PI4 (broken line) and RMS (solid line) command inputs of FIG. 35. In other words, the plot of FIG. 36 depicts the velocity profiles for each of the command inputs of FIG. 35. Taking the second derivative of the command inputs yields the acceleration profiles depicted in FIG. 37 for the PI4 command input (broken line) and the RMS command input (solid line).

Figure 37:
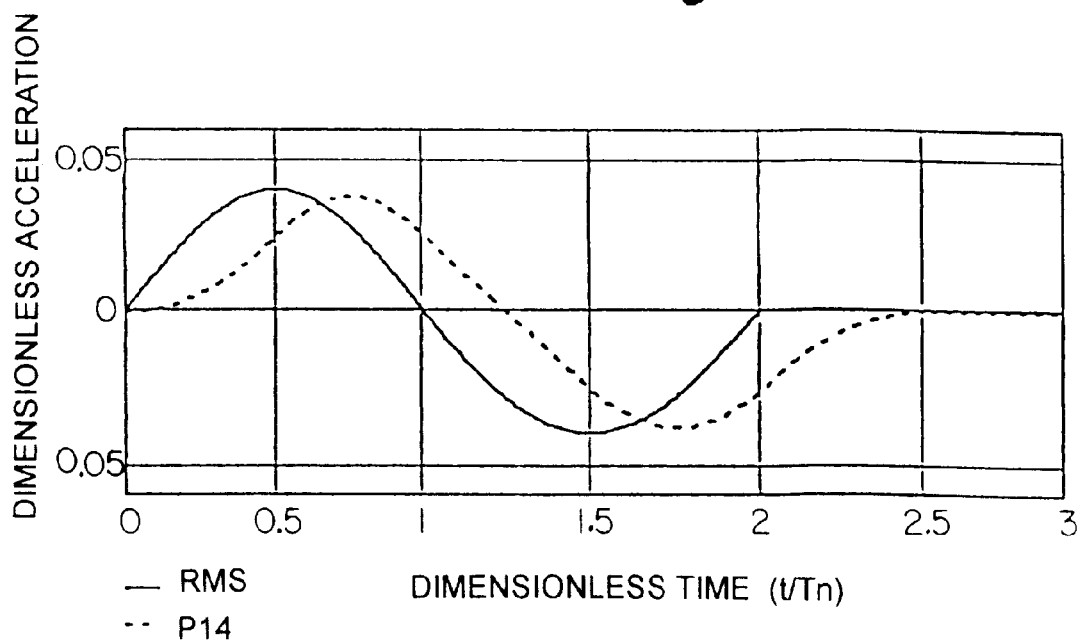
FIG. 37 is a composite plot of the acceleration profiles for the command inputs depicted in FIG. 35.
Figure 38:
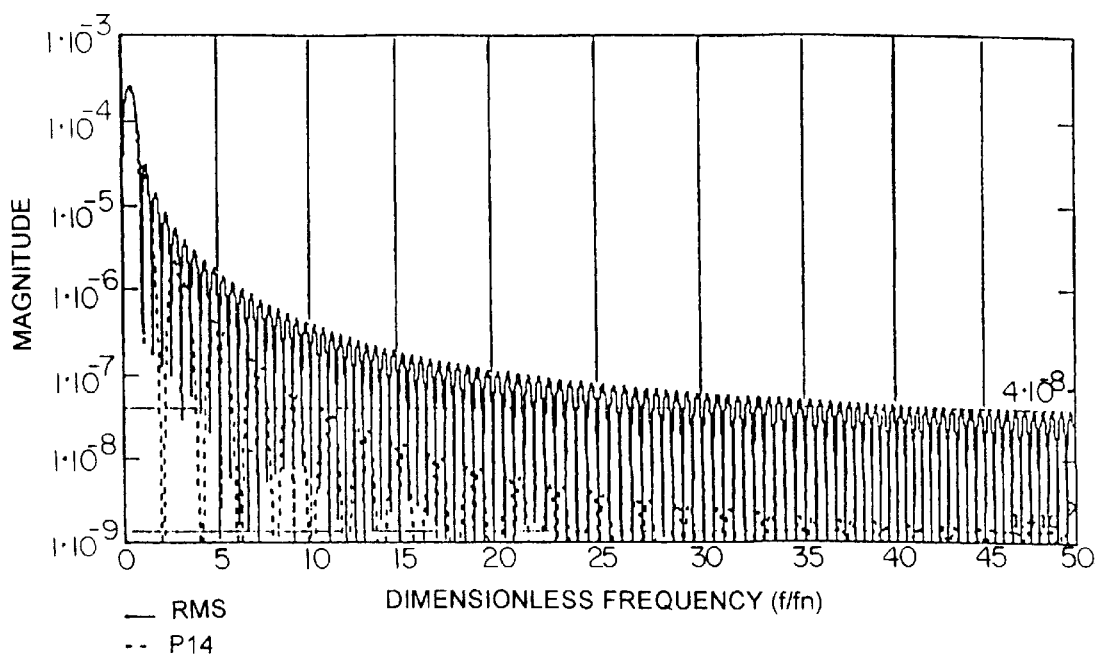
FIG. 38 is a composite plot of the frequency spectra of the acceleration profiles depicted in FIG. 37.

FIG. 38 depicts the acceleration frequency spectra curves based on Fourier Transforms of the command input acceleration profiles of FIG. 37 and allows application of the method of FIG. 4 to determine the relative noise generation potential of the two command inputs. The peaks in the PI4 acceleration frequency spectra curve (broken line) are reduced by a magnitude of nearly ten as compared to the RMS acceleration frequency spectra curve (solid line) over a broad range of the higher frequencies. For example, at the highest frequencies depicted in FIG. 38, the peak spectra of the RMS curve is about $4\times10^{-8}$ while the peak spectra of the PI4 curve is about $1.4\times1^{-9}$ at the same frequency. As a result, the noise generation potential of the PI4 command input can be characterized, according to the methods of the present invention, as having a significantly reduced noise generation potential as compared to the RMS command input.

Figure 39:
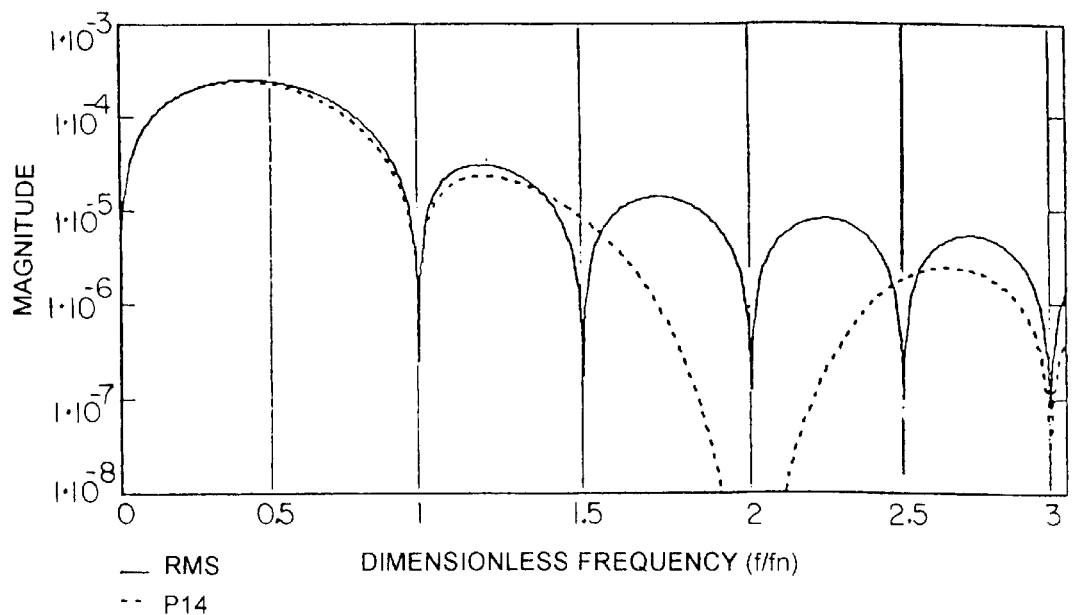
FIG. 39 is an expanded view of the first few lower frequency notches of the frequency spectra of FIG. 38.

FIG. 39 is an expanded view of the first few frequency notches from FIG. 38. The two frequency spectra are nearly identical up to a frequency ratio of about 1.3. After frequency ratio of about 1.6, the PI4 command input exhibits a very broad, deep notch centered on frequency ratio 2.0 and a shallower notch centered on 3.0. Further examination shows that the PI4 frequency spectra exhibits narrow notches at odd integer multiples of $f_n$, and very deep and broad notches at even integer multiples of $f_n$. Although these characteristics may be desirable, it must be remembered that the choice of a PI4 command input over a RMS command input comes with an increased period, i.e., 2.5 $T_n$ versus 2 $T_n$.

What this analysis reveals is that, for applications in which the command input period can be matched to the broader frequency ratio notches in the PI4 acceleration frequency spectra curve (such as at 2.0 $f/f_n$), the PI4 command input can be expected to exhibit increased robustness as compared to any of the corresponding RMS notches at the cost of a longer move time $T_p$. In addition, the robustness plots in FIGS. 20 and 34 show that the PI4 command input is superior to the RMS command input.

Hybrid Command Inputs

All of the command inputs generated by methods according to the present invention have assumed that the desired system output response was within the limitations of the system in terms of, e.g., maximum torque, maximum move distance, maximum voltage, etc. As a result, the desired system output response could be achieved within the period of the command input used to achieve that output response.

It will be understood, however, that situations will exist in which those requirements are not met, i.e., the desired output response cannot be achieved within the period of the chosen command input due to system limitations. In those situations, the command inputs produced according to the present invention can be used in combination with other command inputs to produce a hybrid command input that can produce the desired output response from the system.

Figure 40:
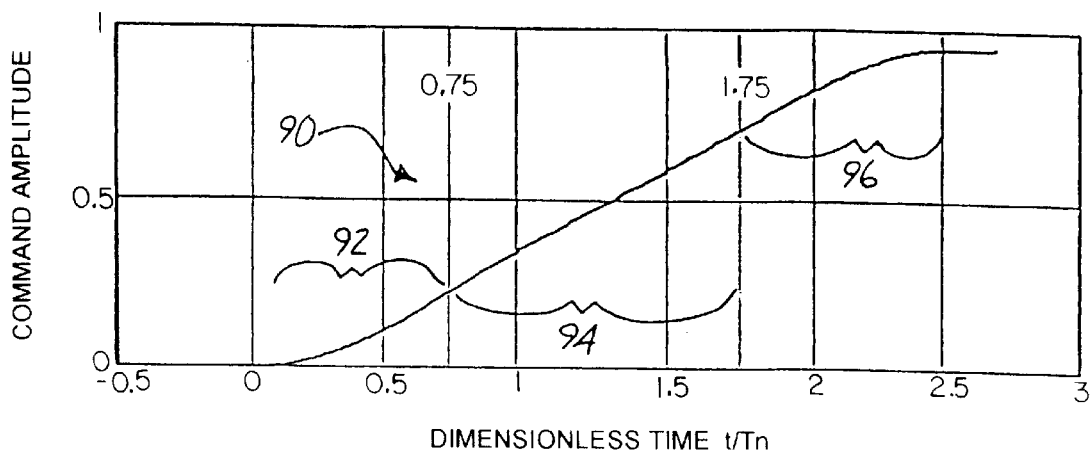
FIG. 40 is a plot of one hybrid command input generated according to the present invention.

One such example is illustrated in FIG. 40 in which the command input 90 includes a first portion 92 from 0 to 0.75 $T_n$ that is an OMC command input as described above. At 0.75 $T_n$, the command input reverts to a standard ramp and hold command input for a second portion 94 with no acceleration for one natural period of the system, i.e., $T_n$. This portion 94 of the command input 90 extends from 0.75 $T_n$ to 1.75 $T_n$. At 1.75 $T_n$, the second half of the OMC command input is implemented for the third portion 96 of the command input 90. This third portion 96 of the command input extends from 1.75 $T_n$ to 2.5 $T_n$. As a result of the addition of the second portion to the command input, the desired output response can be achieved.

It should be noted that it is required that the second portion of the command input extend for one natural period to avoid introducing addition residual oscillation into the output response at the end of the command input period.

Figure 41:
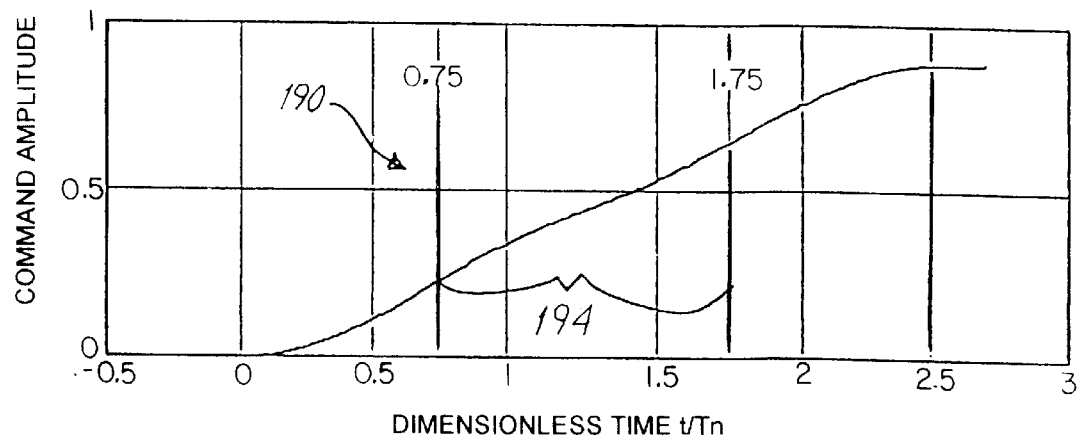
FIG. 41 is a plot of another hybrid command input generated according to the present invention.

An additional variation of the hybrid command input 90 is depicted in FIG. 41 in which the central portion 194 of the hybrid command input 190 is modulated to further reduce the potential for introducing residual oscillation into the output response at the end of the command period. One example of modulation useful in the second portion 194 of the hybrid command input 190 could include a sine wave function with a period of $T_n$.

It will be understood that the command inputs depicted in FIGS. 40 and 41 represent only two examples of hybrid command inputs that could be produced using methods according to the present invention. For example, an RVS, OMC, ATS, PI4 or any other command input could be split by a central portion as described above to achieve a desired system output response for those output responses that exceed the limitations of the system.

Cam Design

Figure 42:
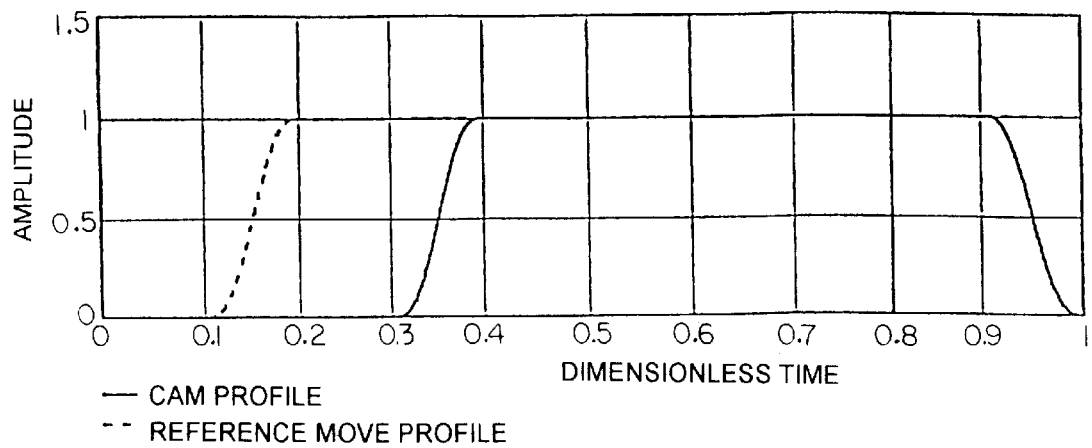
FIG. 42 is a plot of one cam profile that can be designed using methods according to the present invention along with a reference curve.

The methods according to the present invention can also be used effectively in designing cams used in mechanically actuated systems. An example of one cam profile that can be designed in methods according to the present invention is depicted in FIG. 42. The profile depicted in FIG. 42 is based on the RMS command profile described above in connection with Equation 5 and FIG. 18. The cam profile depicted in this example is moving from low dwell to high dwell and from high dwell to low dwell. The cam cycle consists of (a) low dwell from 0 to 0.3 T, (b) a rise profile from 0.3 T to 0.4 T, (c) a high dwell from 0.4 T to 0.9 T, and (d) a fall profile from 0.9 T to T (where T is the cam period in seconds). Those skilled in the art will understand that the cam profile depicted in FIG. 42 could be expressed in terms of the cam angle instead of time if desired.

In the case shown, the rise and fall times are the same and are equal to 0.1 T, although the rise and fall times could be different. The dashed line that begins to rise at 0.1 T for a period of 0.1 T before achieving a constant value is provided as a reference move. This reference move is used in calculating a comparison acceleration profile and frequency spectra.

Figure 43:
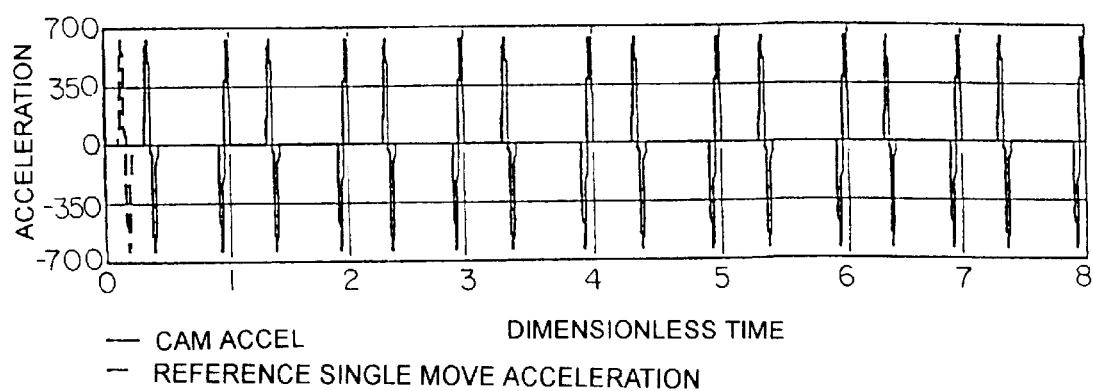
FIG. 43 is a plot of the accelerations corresponding to the cam motion profile from FIG. 42 over a duration of eight cam periods.

FIG. 43 shows the accelerations corresponding to the cam motion profiles from FIG. 42 over a duration of eight cam periods. The solid lines correspond to the actual cam profile and depict both the rise and fall of the cam during each of the eight cycles. The dashed line corresponds to the reference single move profile depicted in FIG. 42.

Figure 44:
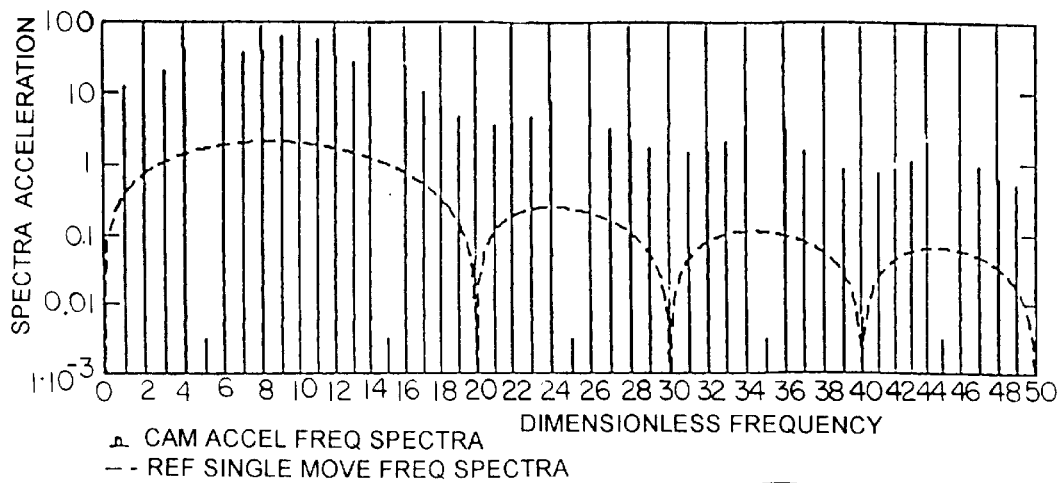
FIG. 44 is a plot of the acceleration frequency spectra for the cam motion profile accelerations depicted in FIG. 43.

The corresponding frequency spectra are shown in FIG. 44 for the cam motion profile accelerations depicted in FIG. 43. The dashed line is the usual acceleration frequency spectra described earlier with zeros at 20, 30, 40, 50, etc. times the fundamental cam frequency $f_s$ (in Hz). The zero values are ten times those shown and described with respect to, e.g., the RMS command input and respective acceleration and acceleration frequency spectra as described in connection with FIGS. 5, 7, and 8 above. The increased spacing between zeros in FIG. 44 is the result of the shortened move period, i.e., the move occurs in 0.1 cam periods in FIGS. 42–44. The cam acceleration in this case is periodic as seen in FIG. 43. As a result, the acceleration frequency spectra has only periodic frequency components.

From the graph of FIG. 44, significant reductions in the frequency components are evident at $5f_s$, $15f_s$, $25f_s$, etc. Smaller, but still significant, reductions in the frequency components are also seen at $10f_s$, $20f_s$, $30f_s$, etc. The frequency components seen at $10f_s$, $20f_s$, $30f_s$, etc. are around 0.01 which is still a reduction of over a thousand to one when compared to the adjacent peaks that have values greater than 10. The smaller peaks at $5f_s$, $15f_s$, $25f_s$, etc. show even greater improvements.

The methods according to the present invention can be used to take advantage of the information provided by the graph of FIG. 44 in that the method can include selecting a structure that has a natural frequency located between any of the periodic frequency components. For example, the first significant reduction or hole in the frequency spectra of the command input represented by the cam profile of FIG. 42 occurs between 4 and 6 $f_s$ and the second significant reduction or hole occurs at 9 to $11f_s$. Among the methods of the present invention, the design of the physical system can be modified so that the fundamental natural frequency of either the structure being driven or the support structure falls into one of the holes in the frequency spectrum. As a result, the system's natural frequency will experience minimum excitation when the cam shaft is operated at a constant speed.

Figure 45:
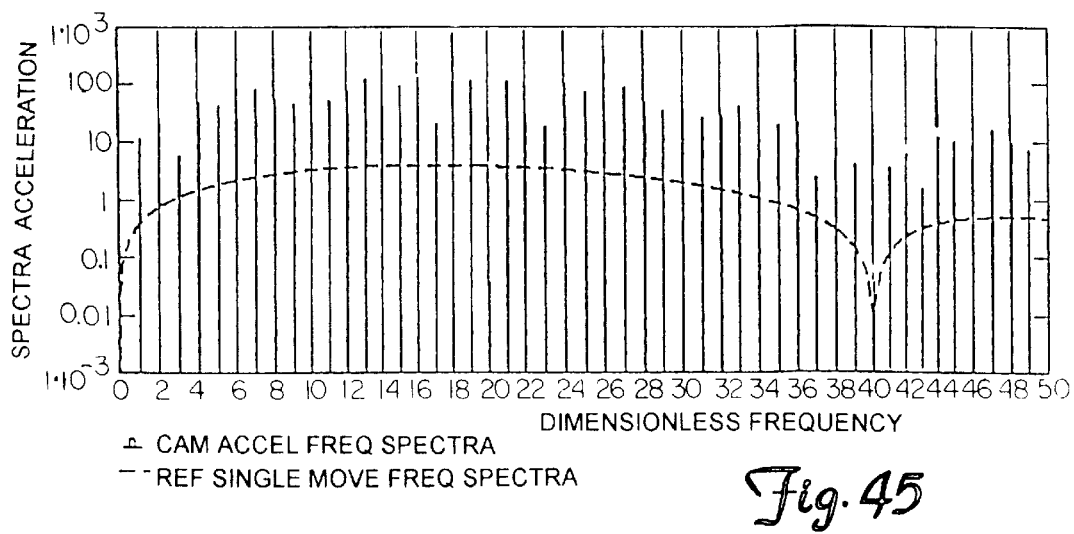
FIG. 45 is a plot of the acceleration frequency spectra for an alternate cam motion profile with 0.05 T rise and fall times.
Figure 46:
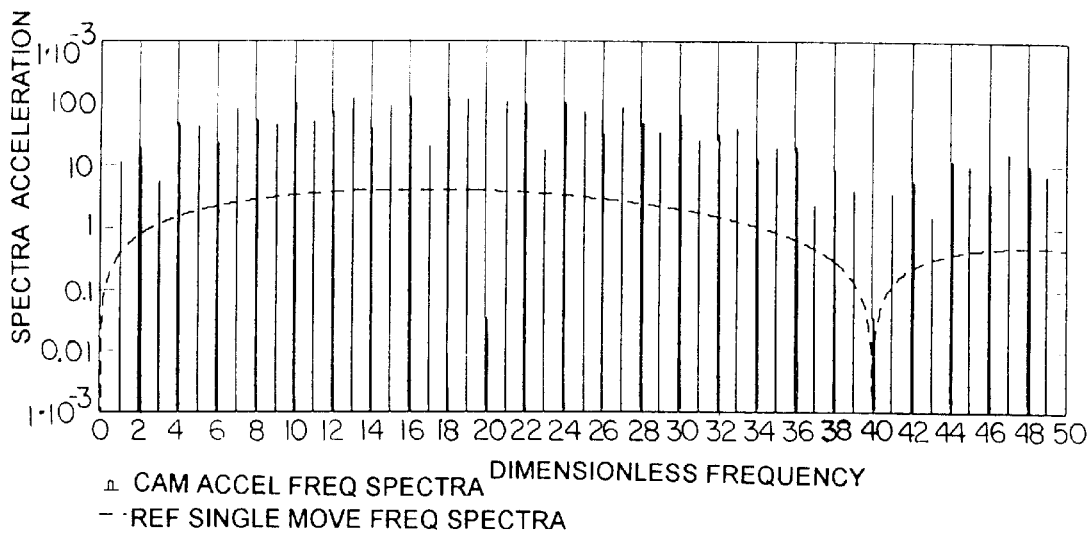
FIG. 46 is a plot of the acceleration frequency spectra for an alternate cam motion profile with 0.1 5 T rise and fall times.

The cam profile depicted in FIG. 42 is one example of a particularly useful cam profile because it provides a relatively large number of holes in the acceleration frequency spectra at relatively low frequencies. For comparison, if the rise and fall time of the same cam profile is changed to either 0.05 T or 0.15 T, the acceleration frequency spectra curves depicted in FIG. 45 (0.05 T rise and fall times) and FIG. 46 (0.15 T rise and fall times) result in which many of the frequency spectra holes found in FIG. 44 disappear. Hence, it is clear that the designer can quickly evaluate the effects of his/her choices in reducing unwanted vibration by studying the effects of either cam profile, dwell spacing, cam rotational speed, etc. relative to the fundamental natural frequencies of the structures being driven.

The following nonlimiting example is provided to illustrate the ability of the present invention to reduce noise generated in a representative physical system.

EXAMPLE

As one example of the ability of the present methods and systems to reduce noise generation in an electromechanical system, an inkjet printer (Hewlett Packard Model No. 680C) uses a stepper motor to drive the inkjet cartridge cover to an open and closed position before and after printing. The command input used to drive the stepper motor in a standard printer is a ramp and hold command input, an example of which is depicted in FIG. 15.

Figure 47:
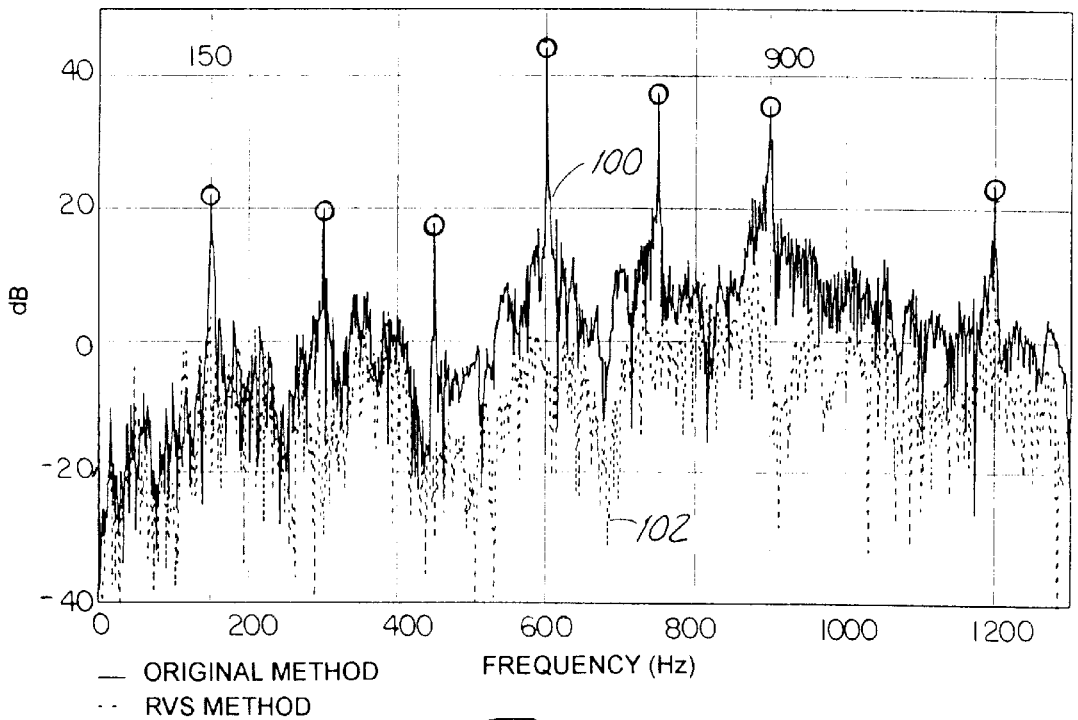
FIG. 47 is a composite plot of the audio frequency spectra generated by a printer using two different command inputs for the stepper motor driving the inkjet printer cartridge.

The printer was placed in a sound proof enclosure to remove background noise and a sound level meter was used to obtain the A-weighted sound radiation produced during operation of the printer. The printer was then operated with the standard ramp and hold command input to drive the inkjet cartridge cover over a known distance for a move time of 1.7 seconds and data was collected on the sound generated by the printer during operation. Solid line 100 in FIG. 47 graphically represents the frequency spectra of the measured sounds.

The standard command input was then replaced by a OMC command input as depicted in, for example, FIG. 16. The printer was then operated over the same move distance for the same time (1.7 seconds) and sound data was recorded. The frequency spectra of the collected data is plotted in FIG. 47 as broken line 102.

The difference in the overall sound pressure levels between the two tests is 19 $dB_A$ with the OMC command input being lower. In addition to producing higher overall sound pressure levels, the standard 1000 half-step ramp command input generated significant peaks at multiples of 150 Hertz; i.e., 150, 300, 450, 600, 750 900, and 1200 Hertz (these peaks are circled to assist in identifying them). The OMC command input, in addition to reducing the overall sound pressure levels, reduced or removed all of those peaks, with several being reduced by more than 40 dB. The practical result was significant reduction in the generally annoying sounds produced by the printer during operation. It should be noted that further improvements in noise reduction could be expected for other command inputs developed according to the present invention such as the RMS command input depicted in FIG. 5 (based on the Fourier Transform results plotted in FIG. 8).

The patents, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments and methods set forth herein.

What is claimed is:

1. A method for providing an output response from a physical system, the method comprising:
    selecting a command input to be applied to a physical system having a fundamental natural frequency ($f_n$);
    obtaining a frequency spectra of a derivative of the command input;
    determining whether the robustness of the command input meets or exceeds a desired level of robustness based on the width of a frequency notch in the frequency spectra; and
    applying the command input to the physical system to obtain an output response if the robustness of the command input meets or exceeds the desired level of robustness.

2. A method according to claim 1, wherein the derivative of the command input is a second derivative of the command input.

3. A method according to claim 1, wherein obtaining the frequency spectra comprises performing a Fourier Transform.

4. A method according to claim 1, wherein the width of the frequency notch is within desired limits at a magnitude equal to a desired percentage of the magnitude of the largest local peak of the frequency spectra.

5. A method according to claim 1, wherein the physical system comprises a stepper motor.

6. A method according to claim 1, wherein the physical system comprises a flexible robotic manipulator.

7. A method for providing an output response from a physical system, the method comprising:
    selecting a command input to be applied to a physical system having a fundamental natural frequency ($f_n$);
    obtaining a frequency spectra of a derivative of the command input;
    determining whether the potential of the command input to generate noise from the physical system meets or exceeds a desired level of potential noise generation based on the peak magnitudes of the frequency spectra; and
    applying the command input to the physical system to obtain an output response if the potential of the command input to generate noise meets or exceeds the desired level of potential noise generation.

8. A method according to claim 7, wherein the derivative of the command input is a second derivative of the command input.

9. A method according to claim 7, wherein obtaining the frequency spectra comprises performing a Fourier Transform.

10. A method according to claim 7, wherein the command input has the desired level of potential noise generation when the frequency spectra of the command input has peak magnitudes below a desired level over a range of frequency ratios.

11. A method according to claim 7, wherein the physical system comprises a stepper motor.

12. A method for providing an output response from a physical system, the method comprising:
    selecting two or more command inputs to be applied to a physical system having a fundamental natural frequency ($f_n$);
    obtaining a frequency spectra of a derivative of each of the command inputs;
    determining the relative robustness of the command inputs based on the width of a frequency notch in each of the frequency spectra, wherein the more robust command input has a wider frequency notch;
    selecting the more robust command input as the final command input; and
    applying the final command input to the physical system to obtain an output response.

13. A method according to claim 12, wherein the derivative of each of the command inputs is a second derivative.

14. A method according to claim 12, wherein obtaining the frequency spectra comprises performing a Fourier Transform for each of the command inputs.

15. A method according to claim 12, wherein the physical system comprises a stepper motor.

16. A method according to claim 12, wherein the physical system comprises a flexible robotic manipulator.

17. A method for providing an output response from a physical system, the method comprising:
    selecting two or more command inputs to be applied to a physical system having a fundamental natural frequency ($f_n$);
    obtaining a frequency spectra of a derivative of each of the command inputs;
    determining the relative potential of each of the command inputs to generate noise from the physical system based on the relative peak magnitudes of each of the frequency spectra over a range of frequency ratios, wherein the peak magnitudes of the frequency spectra of the command input with the smaller potential to generate noise are lower than the peak magnitudes of the frequency spectra of the other command inputs over the range of frequency ratios;
    selecting the command input with the smaller potential to generate noise as the final command input; and
    applying the final command input to the physical system to obtain an output response.

18. A method according to claim 17, wherein the derivative of each of the command inputs is a second derivative.

19. A method according to claim 17, wherein the physical system comprises a stepper motor.

20. A method for providing an output response from a physical system, the method comprising:
    selecting two or more command inputs to be applied to a physical system having a fundamental natural frequency ($f_n$);
    obtaining a frequency spectra of a derivative of each of the command inputs;
    ranking the command inputs for robustness based on the width of a frequency notch in each of the acceleration frequency spectra;

ranking the command inputs for noise generation potential based on the relative peak magnitudes of each of the frequency spectra over a range of frequency ratios;

selecting one of the command inputs based on the rankings for robustness and noise generation; and applying the selected command input to the physical system to obtain an output response.

21. A method according to claim 20, wherein the derivative of each of the command inputs is a second derivative.

22. A method according to claim 20, wherein the frequency notch used to rank the command inputs for robustness is one of the first five frequency notches in each of the frequency spectra.

23. A method according to claim 20, wherein the frequency notch used to rank the command inputs for robustness is the first frequency notch in each of the frequency spectra.

24. An apparatus comprising:

a physical system having a fundamental natural frequency ($f_n$), the physical system providing an output response to a command input; and a control system operatively connected to the physical system, the control system providing the command input to the physical system, the control system comprising two or more preselected command inputs and robustness ranks for the preselected command inputs based on the width of a frequency notch in the frequency spectra of a derivative of each of the preselected command inputs.

25. An apparatus according to claim 24, wherein the derivative of each of the command inputs is a second derivative.

26. An apparatus comprising:

a physical system having a fundamental natural frequency ($f_n$), the physical system providing an output response to a command input; and a control system operatively connected to the physical system, the control system providing the command input to the physical system, the control system comprising two or more preselected command inputs and noise generation potential ranks for each of the preselected command inputs based on the relative peak magnitudes of each of the frequency spectra over a range of frequency ratios for each of the preselected command inputs.

27. An apparatus according to claim 26, wherein the derivative of each of the command inputs is a second derivative.

* * * * *